United States Patent
Zhang et al.

(10) Patent No.: US 10,434,935 B1
(45) Date of Patent: Oct. 8, 2019

(54) INTERACTIVE EXTERNAL VEHICLE-USER COMMUNICATION

(71) Applicants: Nissan North America, Inc., Franklin, TN (US); Renault S.A.S., Boulogne-Billancourt (FR)

(72) Inventors: Jingyi Zhang, San Jose, CA (US); Melissa Cefkin, San Jose, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/024,231

(22) Filed: Jun. 29, 2018

(51) Int. Cl.
| | | |
|---|---|---|
| *B60Q 1/50* | (2006.01) | |
| *G08G 1/16* | (2006.01) | |
| *G05D 1/02* | (2006.01) | |
| *G07C 5/00* | (2006.01) | |
| *G05D 1/00* | (2006.01) | |

(52) U.S. Cl.
CPC ............ *B60Q 1/50* (2013.01); *G05D 1/0088* (2013.01); *G05D 1/0212* (2013.01); *G07C 5/008* (2013.01); *G08G 1/163* (2013.01); *G05D 2201/0213* (2013.01)

(58) Field of Classification Search
CPC ...... B60Q 1/50; G05D 1/0088; G05D 1/0212; G05D 2201/0213; G07C 5/008; G08G 1/163
See application file for complete search history.

(56) References Cited

U.S. PATENT DOCUMENTS

| | | |
|---|---|---|
| 8,954,252 B1 | 2/2015 | Urmson et al. |
| 9,014,905 B1 | 4/2015 | Kretzschmar et al. |
| 9,335,766 B1 * | 5/2016 | Silver .................. G05D 1/021 |
| 9,971,352 B1 * | 5/2018 | Mudalige ............. B60W 30/00 |
| 10,031,231 B2 * | 7/2018 | Zermas ................ G05D 1/0088 |
| 10,067,509 B1 * | 9/2018 | Wang .................. G05D 1/0231 |

(Continued)

OTHER PUBLICATIONS http://www.forbes.com/sites/jimgorzelany/2016/09/16/the-smiling-car-concept-gives-autonomous-autos-a-great-big-emoji/#50b330d696c0 <http://www.forbes.com/sites/jimgorzelany/2016/09/16/the-smiling-car-concept-gives-autonomous-autos-a-great-big-emoji/>, Sep. 16, 2016.

(Continued)

*Primary Examiner* — Mohamed Barakat
(74) *Attorney, Agent, or Firm* — Young Basile Hanlon & MacFarlane, P.C.

(57) ABSTRACT

Interactive external vehicle-user communication may include identifying operational environment information representing a current operational environment for an AV; identifying a target external user based on the current operational environment for the AV, the target external user is identified based on sensor information from a sensor of the AV; controlling the AV to output, for the target external user, a first semiotic representation of a control information of the AV related to the operational environment information; receiving an acknowledgement of the first semiotic representation from the target external user; and in response to the acknowledgement, controlling the AV to traverse the portion of the vehicle transportation network, such that controlling the AV to traverse the portion of the vehicle transportation network includes controlling the AV to output a second semiotic representation based on the acknowledgement from the target external user.

16 Claims, 7 Drawing Sheets

(56) References Cited

U.S. PATENT DOCUMENTS

| | | | |
|---|---|---|---|
| 2017/0132922 A1* | 5/2017 | Gupta | G08G 1/0962 |
| 2017/0270799 A1* | 9/2017 | Takeda | G08G 1/167 |
| 2018/0082584 A1 | 3/2018 | Rajendran et al. | |
| 2018/0136651 A1* | 5/2018 | Levinson | G05D 1/0044 |

OTHER PUBLICATIONS

Video: <https://www.youtube.com/watch?v=INqWGr4dfnU>, Sep. 15, 2016.
http://www.autoblog.com/2016/08/30/drive-ai-autonomous-car-emoji/, Aug. 30, 2016.
https://www.motorauthority.com/news/1106736_mercedes-denies-claims-its-self-driving-cars-will-prioritize-own-occupants-over-other-road-users, Oct. 18, 2016.
https://www.dmv.org/articles/pedestrian-communication-autonomous-vehicles, Sep. 19, 2017.
https://www.fastcompany.com/3064539/self-driving-mercedes-will-be-programmed-to-sacrifice-pedestrians-to-save-the-driver, Oct. 13, 2016.
https://www.aec.at/aeblog/en/2018/02/14/humanising-autonomy/, Feb. 14, 2018.
https://www.aec.at/ai/en/blink-humanising-autonomy/, as early as Apr. 23, 2018.
https://www.viktoria.se/projects/AVIP, as early as Apr. 23, 2018.

\* cited by examiner

INTERACTIVE EXTERNAL VEHICLE-USER COMMUNICATION

TECHNICAL FIELD

This disclosure relates to vehicle operational management and driving, including autonomous vehicle operational management and autonomous driving.

BACKGROUND

A vehicle, such as an autonomous vehicle, may traverse a portion of a vehicle transportation network. Traversing the vehicle transportation network, or a portion thereof, may include generating or capturing, such as by a sensor of the vehicle, data, such as data representing an operational environment, or a portion thereof, of the vehicle. In traversing the vehicle transportation network, the vehicle encounters other road users. Accordingly, a system, method, and apparatus for interactive external vehicle-user communication may be advantageous.

SUMMARY

Disclosed herein are aspects, features, elements, implementations, and embodiments of interactive external vehicle-user communication.

An aspect of the disclosed embodiments is an autonomous vehicle (AV) configured to traverse a portion of a vehicle transportation network. The AV includes a processor that is configured to execute instructions stored on a non-transitory computer readable medium to identify operational environment information representing a current operational environment for the AV, such that the operational environment information includes information representing an identified aspect of the current operational environment; identify a target external user based on the current operational environment for the AV, the target external user is identified based on sensor information from a sensor of the AV; control the AV to output, for the target external user, a first semiotic representation of a control information of the AV related to the operational environment information; receive an acknowledgement of the first semiotic representation from the target external user; and in response to the acknowledgement, control the AV to traverse the portion of the vehicle transportation network, such that controlling the AV to traverse the portion of the vehicle transportation network includes controlling the AV to output a second semiotic representation based on the acknowledgement from the target external user.

Another aspect of the disclosed embodiments is an autonomous vehicle (AV) configured for interactive external vehicle-user communication with integrated semiotic control. The AV includes a processor that is configured to execute instructions stored on a non-transitory computer readable medium to identify an operational context of the AV; confirm an identity of an external user; and in response to confirming the identity of the external user, provide the external user with access to an aspect of the AV based on the operational context.

Another aspect of the disclosed embodiments is a method of traversing a portion of a vehicle transportation network by an autonomous vehicle (AV), including identifying operational environment information representing a current operational environment for the AV, such that the operational environment information includes information representing an identified aspect of the current operational environment; identifying a target external user based on the current operational environment for the AV, the target external user is identified based on sensor information from a sensor of the AV; controlling the AV to output, for the target external user, a first semiotic representation of a control information of the AV related to the operational environment information; receiving an acknowledgement of the first semiotic representation from the target external user; and in response to the acknowledgement, controlling the AV to traverse the portion of the vehicle transportation network, such that controlling the AV to traverse the portion of the vehicle transportation network includes controlling the AV to output a second semiotic representation based on the acknowledgement from the target external user.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
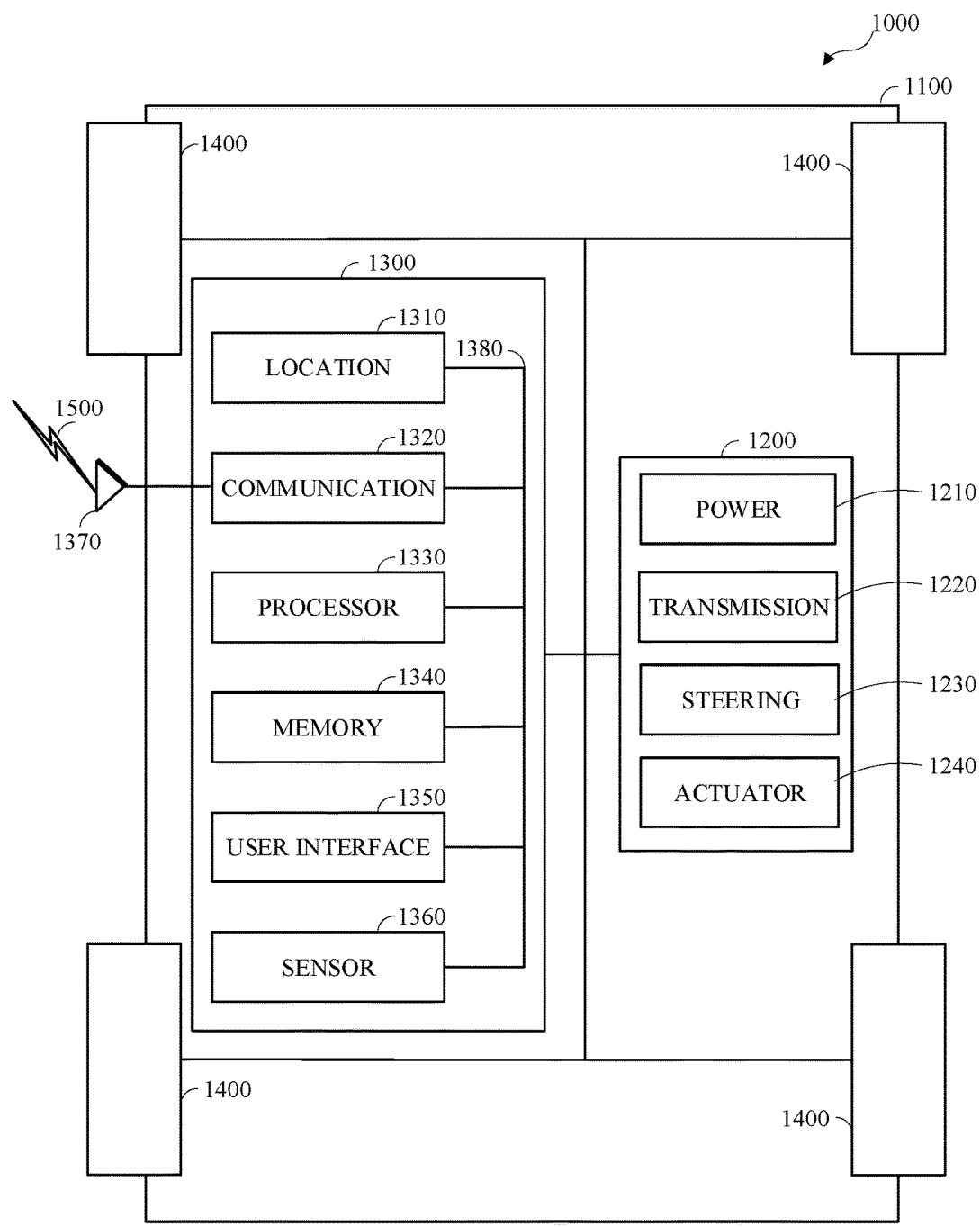
FIG. 1 is a diagram of an example of a vehicle in which the aspects, features, and elements disclosed herein may be implemented.

A vehicle, such as an autonomous vehicle, or a semi-autonomous vehicle, may traverse a portion of a vehicle transportation network, which may include one or more external objects (herein referred to also as users, road users, or other road users), such as pedestrians, remote vehicles, other objects within the vehicle operational environment of the vehicle. Efficiently traversing the vehicle transportation network may include effectively providing information describing the current and imminent operations of the vehicle to the pedestrians, remote vehicles, and other relevant external objects, within the operational environment of the vehicle. Mechanisms for providing information describing the current and imminent operations of the vehicle to the pedestrians, remote vehicles, and other relevant external objects, within the operational environment of the vehicle, receiving acknowledgements, and/or providing additional information describing operations of the vehicle may be limited.

Interactive external vehicle-user communication may include identifying various aspects of the current operational environment of the vehicle, such as the presence of external objects, identifying information regarding current or imminent operations of the vehicle, determining various parameters for outputting a semiotic representation of the current or imminent operations of the vehicle to the pedestrians, remote vehicles, and other relevant external objects, within the operational environment of the vehicle, and outputting the semiotic representation of the current or imminent operations of the vehicle, which may improve the safety and efficiency of vehicle operation. For example, the pedestrians, remote vehicles, and other relevant external objects, within the operational environment of the vehicle may use the information indicated by the semiotic representation to identify an expected path, a current operational state, an imminent operational state, or a combination thereof, for the vehicle.

Outputting the semiotic representation of the current or imminent operations of the vehicle may include controlling one or more modalities for outputting the semiotic representation of the current or imminent operations of the vehicle, which may include controlling the motion of the vehicle to output the semiotic representation of the current or imminent operations of the vehicle or a portion thereof.

Examples of semiotic representations of the current or imminent operations of the vehicle are now provided. In the examples herein, the semiotic representations are shown as including textual messages. However, as is apparent from the description below, other modes (e.g., modalities) of semiotic representations are possible.

For example, a semiotic representation may include information (e.g., an intention indicator or a motion status) that communicates to the other road users an intention (such as regarding a current or planned motion of the vehicle) of the operations of the vehicle. The intention may relate to a current and/or future operation (e.g., action) of the vehicle. Examples of intention indicators include the text messages "I am stopping," "I am yielding," or "I am waiting."

For example, a semiotic representation may include information (e.g., a mode indicator or an operational status indicator) that communicates to the other road users a state of operation of the vehicle, such as, for example, whether autonomous driving is currently activated or not and/or whether a human driver is in the vehicle. Examples of operational status indicators include messages and/or signals (e.g., lights, symbols, etc.) that communicate "Autonomous driving is engaged" and "Autonomous driving is off."

For example, a semiotic representation may include sensory and/or confirmatory information. In an example, the sensory information may communicate to the other road users that the other road users have been detected (such as by receiving sensor information by one or more sensors of the vehicle). An example of a sensory message may be "I see you."

For example, a semiotic representation may include signaling information. In an example of signaling information, the semiotic representation may communicate information due to an emergency or system failure. In an example, the semiotic representation may include a signal and a message. For example, a light output of one or more illuminated elements of the vehicle (such as a turn signal indicating an intention to move the vehicle to a road shoulder) may be operated and the message "I am pulling over to stop" may be displayed.

For example, the semiotic representation may include road-assist signals. Road-assist signals may include information that may aid other road users in traversing a portion of vehicle transportation network. In an example scenario, the vehicle may be stopped at a stop sign to yield for a pedestrian who is crossing. The pedestrian may be occluded from view of another incoming vehicle. As such, the semiotic representation may include a message to the driver of the other vehicle that communicates, essentially, "A pedestrian, who is occluded from your view, is crossing the road."

The semiotic representation may be related to an operational context of the vehicle. An operational context may be related to an operational goal or a purpose of a current operation of the vehicle. One or more parameters may be associated with and/or required by, the operational context.

In an illustrative example of operational context, the vehicle may be operating as an autonomous taxi whereby a customer (i.e., a target external user) whose name is Jim hailed the taxi (such as, virtually via a mobile device, or some other means) and provided a pick-up location (e.g., an address, a landmark, an intersection, etc.). As such, the operational context may be defined as "robo taxi," or the like, and the parameters of the operational context may include the customer's name (i.e., "Jim") and the pick-up location. Upon arriving at the pick-up location, the semiotic representation may include a message that communicates "I am Jim's car."

In another illustrative example of operational context, the vehicle may be operating as an autonomous delivery vehicle whereby a customer (i.e., a target external user) ordered (such as via a website, a mobile device, phone order, and the like) an item (e.g., food) from a vendor and provided a delivery address. As such, the operational context may be defined as "robo delivery," or the like, and the parameters of the operational context may include the customer's name, the delivery item, and the delivery address. Upon arrival at the delivery address, the semiotic representation may include a message that communicates "Your package has arrived."

The examples of the semiotic representations provided above are examples of notifying users (e.g., other road users) of, for example, an operational status, a sensory status, a motion status, or an operational context status. As such, the notifications are one-way communications (e.g., from the vehicle to one or more users).

However, in some situations, it is not sufficient that the vehicle outputs the semiotic representation of the current or imminent operations of the vehicle. In some situations, one-way communication (e.g., from the vehicle to one or more users) is not sufficient for the other road users and/or the vehicle to safely traverse the vehicle transportation network, or a portion thereof.

In some situations, the semiotic representation may be targeted to a specific user (e.g., a target external user) and it is desirable to receive an acknowledgement from the target external user and, in response to the acknowledgement, control the vehicle to traverse the portion of the vehicle transportation network, which may include controlling the vehicle to output a second semiotic representation based on the acknowledgement.

In some situations, such as in the case of an operational context, it may not be sufficient to provide notifications. Rather, in some situations additional interactions may be required to satisfactorily and/or safely complete the operational context.

Although described herein with reference to an autonomous vehicle, the methods and apparatus described herein may be implemented in any vehicle capable of autonomous or semi-autonomous operation. Although described with reference to a vehicle transportation network, the method and apparatus described herein may include the autonomous vehicle operating in any area navigable by the vehicle.

FIG. 1 is a diagram of an example of a vehicle in which the aspects, features, and elements disclosed herein may be implemented. As shown, a vehicle 1000 includes a chassis 1100, a powertrain 1200, a controller 1300, wheels 1400, and may include any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

The controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500. Although FIG. 1 shows the electronic communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the electronic communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. The communication unit 1320 may include a dedicated short-range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 may be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle. The sensors 1360 may include, for example, a speed sensor, acceleration sensors, a steering angle sensor, traction-related sensors, braking-related sensors, steering wheel position sensors, eye tracking sensors, seating position sensors, or any sensor, or combination of sensors, that is operable to report information regarding some aspect of the current dynamic situation of the vehicle 1000.

The sensors 1360 may include sensors that are operable to obtain information regarding the physical environment surrounding the vehicle 1000. For example, one or more sensors may detect road geometry and obstacles, such as fixed obstacles, vehicles, and pedestrians. The sensors 1360 may be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. The trajectory controller may output signals operable to control the vehicle 1000 such that the vehicle 1000 follows the trajectory that is determined by the trajectory controller. For example, the output of the trajectory controller may be an optimized trajectory that may be supplied to the powertrain 1200, the wheels 1400, or both. In some embodiments, the optimized trajectory may be control inputs such as a set of steering angles, with each steering angle corresponding to a point in time or a position. In some embodiments, the optimized trajectory may be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle. An autonomous vehicle may be controlled autonomously, without direct human intervention, to traverse a portion of a vehicle transportation network. Although not shown separately in FIG. 1, in some implementations, an autonomous vehicle may include an autonomous vehicle control unit, which may perform autonomous vehicle routing, navigation, and control. In some implementations, the autonomous vehicle control unit may be integrated with another unit of the vehicle. For example, the controller 1300 may include the autonomous vehicle control unit.

In some implementations, the autonomous vehicle control unit may control or operate the vehicle 1000 to traverse the vehicle transportation network, or a portion thereof, in accordance with current vehicle operation parameters. In another example, the autonomous vehicle control unit may control or operate the vehicle 1000 to perform a defined operation or maneuver, such as parking the vehicle. In another example, autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to a trajectory controller that may operate the vehicle 1000 to travel from the origin to the destination using the generated route.

Figure 2:
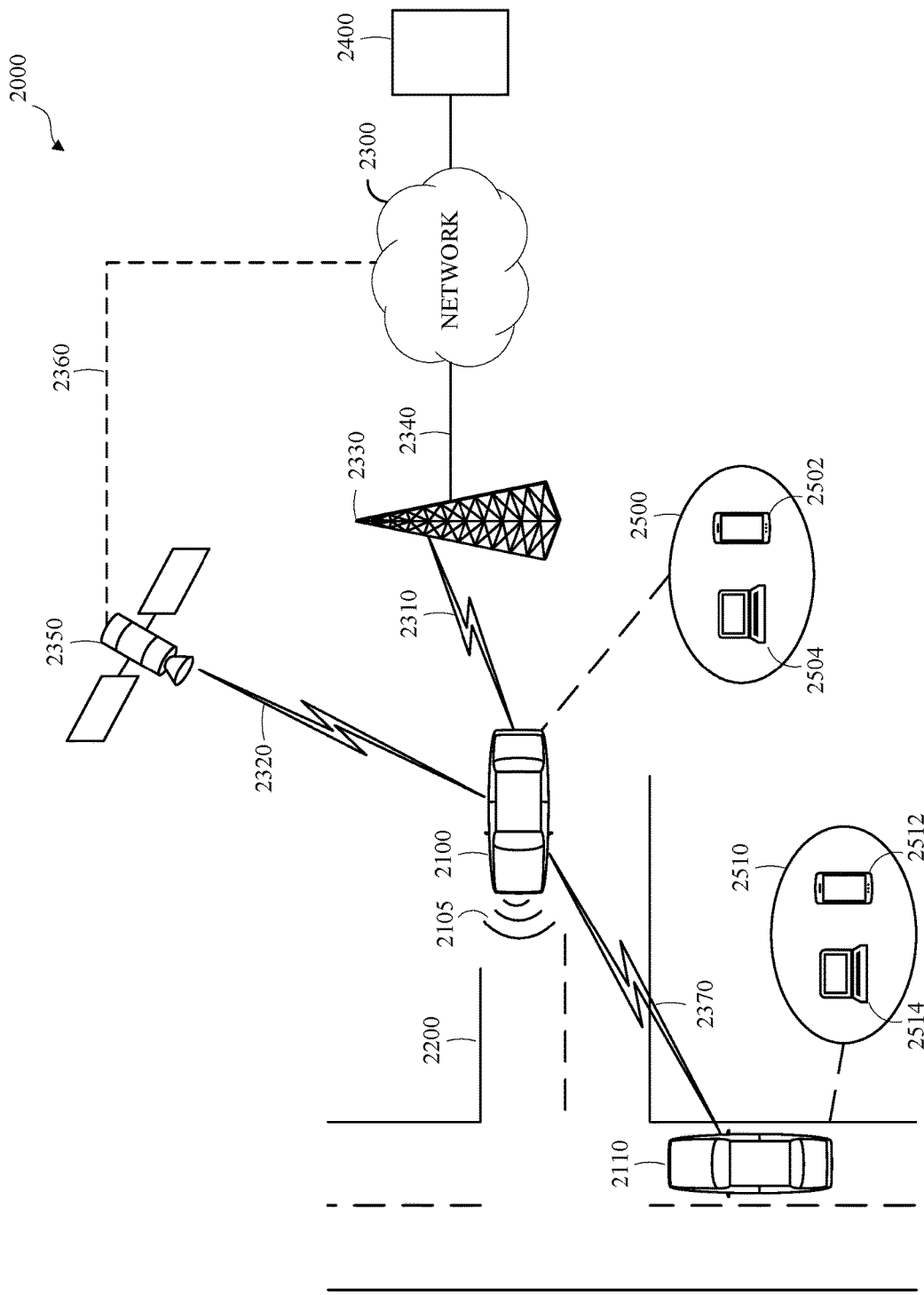
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

The electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the electronic communication network 2300.

A vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle 2100 may receive one or more automated inter-vehicle messages, such as a basic safety message (BSM), from a remote, or target, remote vehicle 2110, via a direct communication link 2370, or via an electronic communication network 2300. For example, the remote vehicle 2110 may broadcast the message to host vehicles within a defined broadcast range, such as 300 meters. In some embodiments, the vehicle 2100 may receive a message via a third party, such as a signal repeater (not shown) or another remote vehicle (not shown). In some embodiments, a vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the electronic communication network 2300 via an access point 2330. An access point 2330, which may include a computing device, may be configured to communicate with a vehicle 2100, with an electronic communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

The vehicle 2100 may communicate with the electronic communication network 2300 via a satellite 2350, or other non-terrestrial communication device. A satellite 2350, which may include a computing device, may be configured to communicate with a vehicle 2100, with an electronic communication network 2300, with one or more communication devices 2400, or with a combination thereof via one or more communication links 2320/2360. Although shown as a single unit, a satellite may include any number of interconnected elements.

An electronic communication network 2300 may be any type of network configured to provide voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit, an electronic communication network may include any number of interconnected elements.

A vehicle 2100 may identify a portion or condition of the vehicle transportation network 2200. For example, the vehicle may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

A vehicle 2100 may traverse a portion or portions of one or more vehicle transportation networks 2200 using information communicated via the electronic communication network 2300, such as information representing the vehicle transportation network 2200, information identified by one or more on-vehicle sensors 2105, or a combination thereof.

Although, for simplicity, FIG. 2 shows one vehicle 2100, one vehicle transportation network 2200, one electronic communication network 2300, and one communication device 2400, any number of vehicles, networks, or computing devices may be used. In some embodiments, the vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the electronic communication network 2300, the vehicle 2100 may communicate with the communication device 2400 via any number of direct or indirect communication links. For example, the vehicle 2100 may communicate with the communication device 2400 via a direct communication link, such as a Bluetooth communication link.

A vehicle 2100/2210 may be associated with an entity 2500/2510, such as a driver, operator, or owner of the vehicle. An entity 2500/2510 associated with a vehicle 2100/2110 may be associated with one or more personal electronic devices 2502/2504/2512/2514, such as a smartphone 2502/2512 or a computer 2504/2514. A personal electronic device 2502/2504/2512/2514 may communicate with a corresponding vehicle 2100/2110 via a direct or indirect communication link. Although one entity 2500/2510 is shown as associated with one vehicle 2100/2110 in FIG. 2, any number of vehicles may be associated with an entity and any number of entities may be associated with a vehicle.

Figure 3:
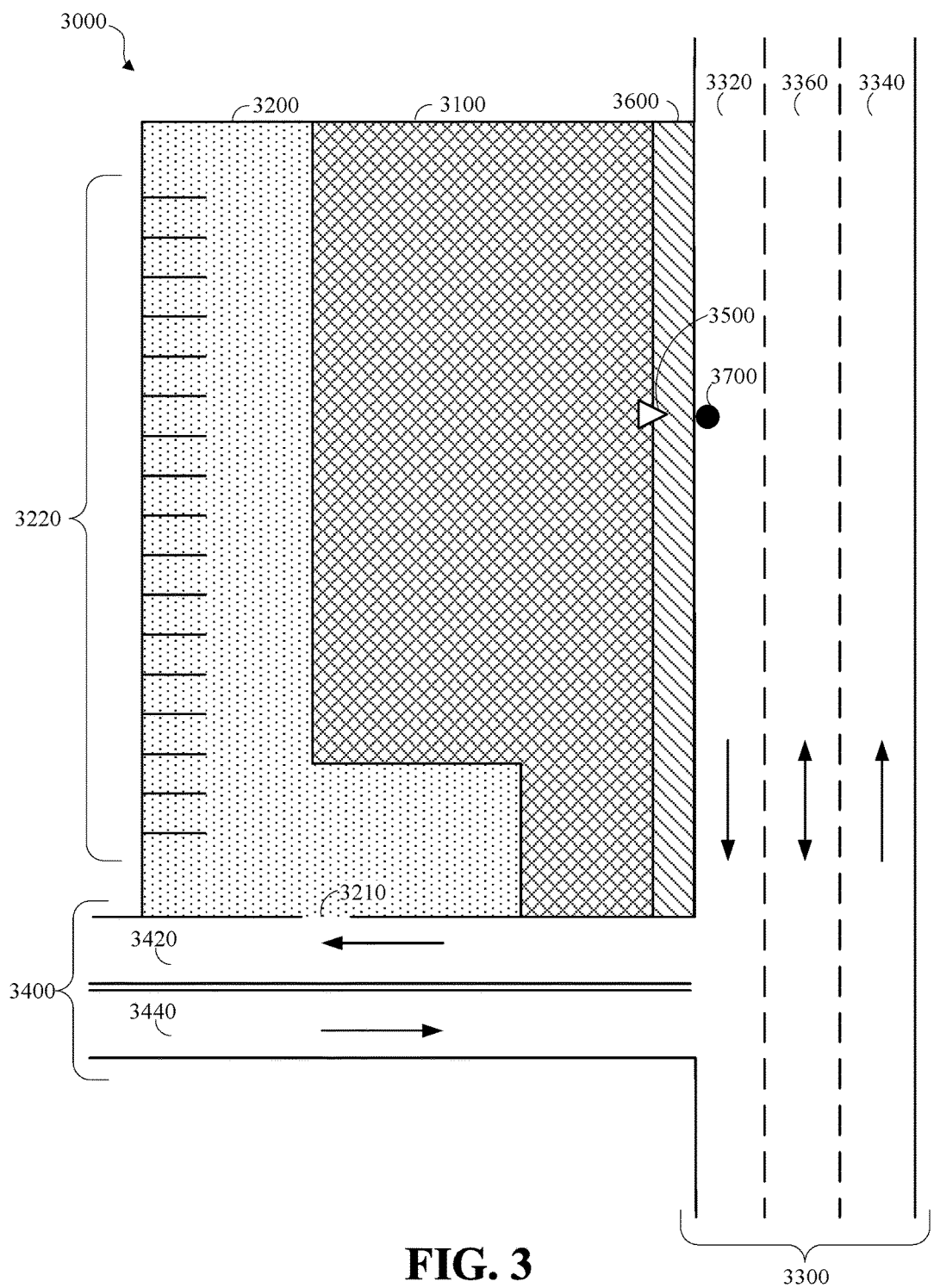
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. An autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network may include one or more interchanges 3210 between one or more navigable, or partially navigable, areas 3200/3300/3400. For example, the portion of the vehicle transportation network shown in FIG. 3 includes an interchange 3210 between the parking area 3200 and road 3400. In some embodiments, the parking area 3200 may include parking slots 3220.

A portion of the vehicle transportation network, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. The vehicle transportation network information may include vehicle transportation network control information, such as direction of travel information, speed limit information, toll information, grade information, such as inclination or angle information, surface material information, aesthetic information or a combination thereof.

A portion, or a combination of portions, of the vehicle transportation network may be identified as a point of interest or a destination. For example, the vehicle transportation network information may identify a building, such as the unnavigable area 3100, and the adjacent partially navigable parking area 3200 as a point of interest, an autonomous vehicle may identify the point of interest as a destination, and the autonomous vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Identifying a destination may include identifying a location for the destination, which may be a discrete uniquely identifiable geolocation. For example, the vehicle transportation network may include a defined location, such as a street address, a postal address, a vehicle transportation network address, a GPS address, or a combination thereof for the destination.

A destination may be associated with one or more entrances, such as the entrance 3500 shown in FIG. 3. The vehicle transportation network information may include defined entrance location information, such as information identifying a geolocation of an entrance associated with a destination. Predicted entrance location information may be determined as described herein.

The vehicle transportation network may be associated with, or may include, a pedestrian transportation network. For example, FIG. 3 includes a portion 3600 of a pedestrian transportation network, which may be a pedestrian walkway. A pedestrian transportation network, or a portion thereof, such as the portion 3600 of the pedestrian transportation network shown in FIG. 3, may be represented as pedestrian transportation network information. The vehicle transportation network information may include pedestrian transportation network information. A pedestrian transportation network may include pedestrian navigable areas. A pedestrian navigable area, such as a pedestrian walkway or a sidewalk, may correspond with a non-navigable area of a vehicle transportation network. Although not shown separately in FIG. 3, a pedestrian navigable area, such as a pedestrian crosswalk, may correspond with a navigable area, or a partially navigable area, of a vehicle transportation network.

A destination may be associated with one or more docking locations, such as the docking location 3700 shown in FIG. 3. A docking location 3700 may be a designated or undesignated location or area in proximity to a destination at which an autonomous vehicle may stop, stand, or park such that docking operations, such as passenger loading or unloading, may be performed.

The vehicle transportation network information may include docking location information, such as information identifying a geolocation of one or more docking locations 3700 associated with a destination. The docking location information may be defined docking location information, which may be docking location information manually included in the vehicle transportation network information. For example, defined docking location information may be included in the vehicle transportation network information based on user input. The docking location information may be automatically generated docking location information as described herein. Although not shown separately in FIG. 3, docking location information may identify a type of docking operation associated with a docking location 3700. For example, a destination may be associated with a first docking location for passenger loading and a second docking location for passenger unloading. Although an autonomous vehicle may park at a docking location, a docking location associated with a destination may be independent and distinct from a parking area associated with the destination.

In an example, an autonomous vehicle may identify a point of interest, which may include the unnavigable area 3100, the parking area 3200, and the entrance 3500, as a destination. The autonomous vehicle may identify the unnavigable area 3100, or the entrance 3500, as a primary destination for the point of interest, and may identify the parking area 3200 as a secondary destination. The autonomous vehicle may identify the docking location 3700 as a docking location for the primary destination. The autonomous vehicle may generate a route from an origin (not shown) to the docking location 3700. The autonomous vehicle may traverse the vehicle transportation network from the origin to the docking location 3700 using the route. The autonomous vehicle may stop or park at the docking location 3700 such that passenger loading or unloading may be performed. The autonomous vehicle may generate a subsequent route from the docking location 3700 to the parking area 3200, may traverse the vehicle transportation network from the docking location 3700 to the parking area 3200 using the subsequent route, and may park in the parking area 3200.

Figure 4:
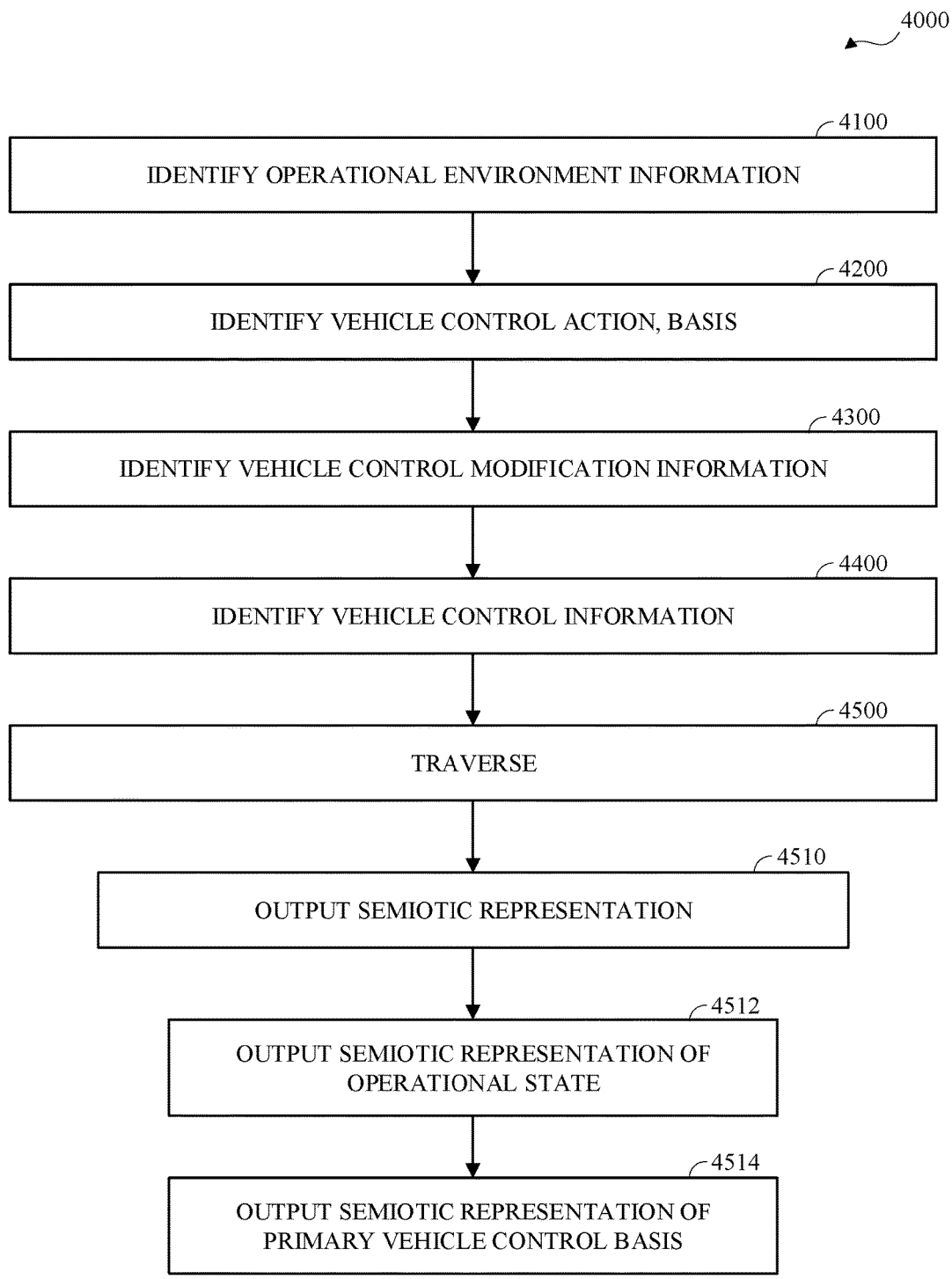
FIG. 4 is a diagram of an example of interactive external vehicle-user communication with integrated semiotic control in accordance with implementations of this disclosure.

FIG. 4 is a diagram of an example of interactive external vehicle-user communication with integrated semiotic control in accordance with implementations of this disclosure. Interactive external vehicle-user communication with integrated semiotic control 4000 may be implemented in a vehicle, such as the vehicle 1000 shown in FIG. 1 or one of the vehicles 2100/2110 shown in FIG. 2, which may be an autonomous vehicle, a semi-autonomous vehicle, or any other vehicle implementing autonomous driving.

A vehicle, such as an autonomous vehicle, may traverse a vehicle transportation network, or a portion thereof, such as the vehicle transportation network 3000 shown in FIG. 3, which may include traversing distinct vehicle operational scenarios. A distinct vehicle operational scenario may include any distinctly identifiable set of operative conditions that may affect the operation of the vehicle within a defined spatiotemporal area, or operational environment, of the vehicle, such as within a defined operative distance from a current spatiotemporal location of the vehicle, such as within 1500 meters of a current geospatial location of the vehicle or within 30 seconds of a current temporal location of the vehicle.

For example, a distinct vehicle operational scenario may be based on a number or cardinality of roads, road segments, or lanes that the vehicle may traverse within a defined spatiotemporal distance. In another example, a distinct vehicle operational scenario may be based on one or more traffic control devices that may affect the operation of the vehicle within a defined spatiotemporal area, or operational environment, of the vehicle. In another example, a distinct vehicle operational scenario may be based on one or more identifiable rules, regulations, or laws that may affect the operation of the vehicle within a defined spatiotemporal area, or operational environment, of the vehicle. In another example, a distinct vehicle operational scenario may be based on one or more identifiable external objects that may affect the operation of the vehicle within a defined spatiotemporal area, or operational environment, of the vehicle.

Examples of distinct vehicle operational scenarios include a distinct vehicle operational scenario wherein the vehicle is traversing an intersection; a distinct vehicle operational scenario wherein a pedestrian is crossing, or approaching, the expected path of the vehicle; and a distinct vehicle operational scenario wherein the vehicle is changing lanes. Other distinct vehicle operational scenarios may be used.

Aspects of the operational environment of the vehicle may be represented within respective distinct vehicle operational scenarios. For example, the relative orientation, operational state, trajectory, expected path, or any other information, or combination of information, describing one or more external objects may be represented within respective distinct vehicle operational scenarios. In another example, the relative geometry of the vehicle transportation network may be represented within respective distinct vehicle operational scenarios.

Interactive external vehicle-user communication with integrated semiotic control 4000 may include identifying operational environment information at 4100, identifying a vehicle control action at 4200, identifying vehicle control modification information at 4300, identifying vehicle control information at 4400, controlling the vehicle to traverse the vehicle transportation network, or a portion thereof, at 4500, or a combination thereof.

Operational environment information representing the operational environment of the vehicle may be identified at 4100. Identifying the operational environment information at 4100 may include receiving, identifying, or otherwise accessing, operational environment information representing an operational environment for the vehicle, such as a current operational environment or an expected operational environment, or one or more aspects thereof. The operational environment of the vehicle may include a distinctly identifiable set of operative conditions that may affect the operation of the vehicle within a defined spatiotemporal area of the vehicle. The operational environment information may be identified based on sensor information, information received from an external source, any other data source, or a combination thereof, unless expressly indicated herein, or otherwise unambiguously clear from context.

Identifying the operational environment information may correspond with identifying a distinct vehicle operational scenario. Identifying the operational environment information may include identifying operational environment information according to one or more groups, types, or categories of operational environment information. For example, identifying the operational environment information may include identifying empirical information representing a natural or artificial aspect of the operational environment, identifying vehicle transportation network information representing a defined aspect of the vehicle transportation network in the operational environment, identifying external object information representing an external object in the current operational environment, identifying external activity information representing an external activity for the current operational environment, or identifying vehicle information, which may include vehicle configuration information, such as user configuration information. Other categories, or categorizations, of information representing the operational environment of the vehicle may be used.

For simplicity and clarity, elements of the operational environment information may be described herein using determinative or relativistic terminology. For example, empirical information may be described herein as indicating that weather conditions are dry. However, the values of the operational environment information may be Boolean values, such as a Boolean value indicating that a corresponding metric for a respective aspect of the operational environment exceeds a defined corresponding threshold or varies from a defined corresponding range, or numeric values, such as a value indicating a defined category for the respective aspect of the operational environment or a value indicating a measurement or a level for respective aspect of the operational environment. Identifying the operational environment information may include evaluating, processing, or otherwise determining a correspondence between, for example, a measurement for a respective aspect of the operational environment and a corresponding Boolean value, such as by determining whether a measurement exceeds a defined threshold.

The empirical information may represent a natural or artificial aspect or state of the operational environment that may be identified, determined, predicted, or derived based on sensor information generated by a sensor of the vehicle, such as a temporal aspect, an illumination aspect of the operational environment, a weather related aspect of the operational environment, a road surface condition of the operational environment, or any other natural or artificial condition that may affect the operation of the vehicle within the operational environment. The empirical information may be determined based on a combination of sensor information and other information.

For example, a sensor of the vehicle may be an ambient light sensor and identifying the empirical information may include identifying the empirical information in response to ambient light level information determined by the ambient light sensor. In some embodiments, the ambient light level may exceed a defined daylight threshold, and the empirical information may indicate a day, or daylight, condition of the operational environment. In some embodiments, the ambient light level may be within, such as equal to or less than, a defined daylight threshold and the empirical information may indicate a night, or dark, condition of the operational environment.

In some embodiments, some empirical information may be unavailable and defined or expected empirical information may be used. For example, current weather information may be unavailable, and a defined expected value, such as clear or dry, may be used as the empirical weather information.

The vehicle transportation network information may represent a defined aspect of the vehicle transportation network in the operational environment. The vehicle transportation network information may include information representing the vehicle transportation network proximate to the vehicle, such as within a defined spatial distance of the vehicle, such as 1500 meters, which may include information indicating the geometry of one or more aspects of the vehicle transportation network, information indicating a condition, such as a surface condition, of the vehicle transportation network, or any combination thereof. For example, the vehicle transportation network information identified at 4100 may be similar to the vehicle transportation network information described in relation to FIG. 3.

The vehicle transportation network information may indicate a roadway size, configuration, or geometry, a speed constraint or other vehicle transportation network access or use regulation or standard, an intersection type, a traffic control device, a geographical area type, such as residential or commercial, road or surface material, zoning, weather information received from an external source, or any other defined information regarding the vehicle transportation network that may affect the operation of the vehicle within the operational environment.

The vehicle transportation network information may indicate that the operational environment includes, or is within a defined proximity of, a defined location, such as a school, a hospital, a bar, a museum, a park, a railway, a railway station, or a defined location type, such as a residential area or neighborhood, an urban area, a commercial area, a rural area, an industrial area, a highway area, or any other defined location or location type that may affect the operation of the vehicle within the operational environment.

In another example, the vehicle transportation network information may include received defined information, such as weather information received from an external source, which may indicate a weather condition of the operational environment, such as rain, snow, fog, or any other weather condition, or combination of conditions, that may affect the operation of the vehicle within the operational environment. For example, the vehicle transportation network information may indicate that a probability of an icy road condition exceeds a defined threshold. In another example, the vehicle transportation network information may indicate an amount of rain, or a rate of rainfall, or any other information about the vehicle transportation network that may affect the operation of the vehicle within the operational environment.

In some embodiments, some vehicle transportation network information, such as vehicle transportation network information based on stored vehicle transportation network information, may be unavailable and defined or expected vehicle transportation network information may be used. For example, vehicle transportation network information indicating a number of lanes for a current portion of the vehicle transportation network may be unavailable, and a defined expected value such as one lane may be used as the vehicle transportation network information. In some embodiments, vehicle transportation network information may be generated based on sensor information.

The external object information may represent an external object in the current operational environment. For example, the external object information may represent external objects within the operational environment of the vehicle, such as road users, pedestrians, non-human animals, non-motorized devices, such as bicycles or skateboards, motorized devices, such as remote vehicles, or any other external object, obstacle, entity, or combination thereof, that may affect the operation of the vehicle within the operational environment. External objects may be identified based on, for example, defined information, such as information received from a remote vehicle, or based on sensor data reported by a sensor of the vehicle.

A relevant external object may be an external object oriented with respect to the vehicle such that traversal of a portion of the current operational environment by the external object, or any other operation of the external object that may affect the traversal of any object, which may include the current vehicle, within the current operational environment may be affected by controlling the vehicle to traverse a portion of the vehicle transportation network in accordance with the vehicle control information such that controlling the vehicle to traverse a portion of the vehicle transportation network in accordance with the vehicle control information includes outputting the semiotic representation of the vehicle control information.

The external object information may include aggregate information, such as information indicating a number, count, or cardinality of external objects within the operational environment, or may indicate an external object state for the operational environment, such as crowded or deserted. The external object information may include, for a respective external object, location information, kinetic, velocity, or motion, or imminent or expected kinetic, velocity, or motion, information, expected path information, information indicating whether the external object is a blocking object, which may prevent the vehicle or another external object from traversing a current or expected location of the blocking external object, a non-blocking object, which may prevent the vehicle from traversing and may allow some or all other external objects to traverse the current or expected location of the non-blocking external object, or any other information regarding the external object that may affect the operation of the vehicle within the operational environment.

In some embodiments, some external object information, such as external object information based on sensor information or external object information based on received information, may be unavailable and defined or expected external object information may be used. For example, sensor information indicating external objects may be unavailable, and a defined expected value indicating the absence of external objects may be used as the external object information.

The external activity information may represent an external activity or event, or an imminent or expected external activity or event, for the current operational environment. The external activity information may be independent of individual external objects or may be identified independently of identifying the external objects. The external activity information may be identified based on received activity information, such as information identified based on social media data, which may include aggregate social media data, such as data indicating an aggregate number, count, or cardinality, of social media postings geographically and temporally proximate to the operational environment, or associated with a defined use of an area geographically and temporally proximate to the operational environment. For example, the external activity information may indicate that an event, such as a sporting event, a concert, a rally, a parade, or the like, is spatially and temporally proximate to the operational environment, or that other social activity, such as high human activity density, or any other activity or event that may affect the operation of the vehicle within the operational environment.

The external activity information may indicate an eventful state, which may indicate an external activity or event, or an imminent or expected external activity or event, geographically and temporally proximate to the operational environment. The external activity information may indicate an uneventful state, which may indicate an absence of any identified external activity or event, or imminent or expected external activity or event, geographically and temporally proximate to the operational environment. In some embodiments, the external activity information may include information indicating other aspects of the external activity, such as an activity type, an activity size, or the like.

In some embodiments, some external activity information, such as external activity information based on sensor information or external activity information based on received information, may be unavailable and defined or expected external activity information may be used. For example, received information indicating external activities may be unavailable, and a defined expected value indicating the absence of external activities may be used as the external activity information.

The user configuration information may include, for example, information indicating a vehicle control optimization priority for one or more users of the vehicle. The user configuration information may be user defined, such as information identified or stored in response to user input indicating the user configuration. The user configuration information may be automatically identified configuration information, such as information identified based on use patterns.

For example, a low vehicle control optimization priority may indicate a user preference for slower acceleration rates, longer lead times, longer signaling times, and the like, and a high vehicle control optimization priority may indicate a user preference for minimizing driving times, such as by minimizing lead times, minimizing signaling times, and increasing acceleration and deceleration rates.

In some embodiments, the user configuration information may include information corresponding to defined aspects of vehicle operation, such as information corresponding to respective vehicle control actions, vehicle operational scenarios, or combinations thereof.

In some embodiments, some user configuration information, such as user configuration information based on user input or automatically generated user configuration information, may be unavailable and defined or expected user configuration information may be used. For example, user input information indicating a user configuration may be unavailable, and a defined expected value for the user configuration may be used as the user configuration information.

The operational environment information may include vehicle state information for the vehicle, such as information indicating a geospatial location of the vehicle, information correlating the geospatial location of the vehicle to the vehicle transportation network information, a route of the vehicle, a velocity of the vehicle, an acceleration state of the vehicle, other vehicle directional, motion, or kinetic state information, passenger information of the vehicle, or any other information about the vehicle or the operation of the vehicle.

In some embodiments, identifying the operational environment information representing the operational environment of the vehicle at 4100 may include monitoring the operational environment of the vehicle, or defined aspects thereof, or receiving operational environment information from another system, device, or unit of the vehicle monitoring the operational environment of the vehicle, such as an operational environment monitor of the vehicle.

Monitoring the operational environment of the vehicle may include identifying and tracking one or more aspects or states of the operational environment, such as external objects, identifying distinct vehicle operational scenarios, or a combination thereof. Identifying and tracking the external objects may include identifying spatiotemporal locations of respective external objects, which may be relative to the vehicle, identifying (such as described with the respect to object hypotheses below) one or more expected paths for respective external objects, which may include identifying a speed, a trajectory, or both, for an external object.

For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both.

Identifying the operational environment information may include identifying operational environment information according to multiple aspects within a category of operational environment information. For example, identifying the operational environment information may include identifying empirical information representing an illumination state and identifying empirical information representing a precipitation state.

A vehicle control action may be identified at 4200. The vehicle control action may indicate a vehicle control operation or maneuver, such as accelerating, decelerating, turning, stopping, or any other vehicle operation or combination of vehicle operations that may be performed by the vehicle in conjunction with traversing a portion of the vehicle transportation network, such as a current portion of the vehicle transportation network, which may be a portion of the vehicle transportation network within the operational environment of the vehicle.

The vehicle control action may be a non-semiotic vehicle control action. A non-semiotic vehicle control action may be a vehicle control action for traversing the vehicle transportation network, or a portion thereof, or otherwise controlling or operating the vehicle independent of controlling or operating the vehicle to output a corresponding or related semiotic representation.

The vehicle control action may be received from another system, device, or unit of the vehicle, such as a routing and navigation control unit of the vehicle or an autonomous vehicle operational management controller of the vehicle. In an example, the vehicle control action may be received in accordance with a trajectory determined (e.g., calculated)

for the vehicle. The trajectory may be determined by a trajectory planner, such as the trajectory planner described with respect to FIG. 5.

For example, the vehicle control action may be a 'Stop' vehicle control action for controlling the vehicle to traverse the vehicle transportation network, or a portion thereof, by controlling an acceleration unit, a braking unit, another velocity control unit, or combination of velocity control units, to stop the vehicle or otherwise control the vehicle to become or remain stationary.

The vehicle control action may be a 'Yield' vehicle control action for controlling the vehicle to traverse the vehicle transportation network, or a portion thereof, by controlling an acceleration unit, a braking unit, another velocity control unit, or combination of velocity control units, to slow the vehicle or otherwise control the vehicle to move at a speed within a defined threshold or range, which may be lower than or within a defined statutory speed limit.

The vehicle control action may be an 'Advance' vehicle control action for controlling the vehicle to traverse the vehicle transportation network, or a portion thereof, by slowly inching forward a short distance, such as a few inches or a foot.

The vehicle control action may be an 'Accelerate' vehicle control action for controlling the vehicle to traverse the vehicle transportation network, or a portion thereof, by accelerating a defined acceleration rate, or at an acceleration rate within a defined range. Although some vehicle control operations, such as acceleration and deceleration, are described herein as having a value or rate for simplicity, the vehicle control operations may be associated with variable values or rates, such as rates along a curve or a sequence of rates.

The vehicle control action may be a 'Decelerate' vehicle control action for controlling the vehicle to traverse the vehicle transportation network, or a portion thereof, by decelerating a defined deceleration rate, or at a deceleration rate within a defined range.

The vehicle control action may be a 'Maintain' vehicle control action for controlling the vehicle to traverse the vehicle transportation network, or a portion thereof, in accordance with current operational parameters, such as by maintaining a current velocity, maintaining a current path or route, maintaining a current lane orientation, or the like.

The vehicle control action may be a 'Proceed' vehicle control action for controlling the vehicle to traverse the vehicle transportation network, or a portion thereof, by beginning or resuming a previously identified set of operational parameters, which may include controlling the vehicle to traverse the vehicle transportation network, or a portion thereof, in accordance with one or more other vehicle control actions. For example, the vehicle may be stationary at an intersection, an identified route for the vehicle may include traversing through the intersection, and controlling the vehicle in accordance with a 'Proceed' vehicle control action may include controlling the vehicle to accelerate at a defined acceleration rate to a defined velocity along the identified path. In another example, the vehicle may be traversing a portion of the vehicle transportation network at a defined speed, rate, or velocity, a lane change may be identified for the vehicle, and controlling the vehicle in accordance with a 'Proceed' vehicle control action may include controlling the vehicle to perform a sequence of trajectory adjustments in accordance with defined lane change parameters such that the vehicle performs the identified lane change operation.

In some embodiments, a vehicle control action may include, or may be associated with, one or more performance parameters. A performance parameter may indicate a value, or a range of values, for controlling one or more operational elements, or operational control elements, of the vehicle, such as to traverse the vehicle transportation network, or a portion thereof. The operational elements of the vehicle may include systems, devices, or units for controlling a velocity of the vehicle, or other kinetic state of the vehicle, a semiotic representation output operational state of the vehicle, or any other operational state, or combination of operational states, of the vehicle that may be autonomously, or semi-autonomously controlled, which may include internal temperature controls, media system controls, window controls, and the like.

For example, a 'Stop' vehicle control action may include, or may be associated with, a performance parameter indicating a deceleration rate. In another example, performance parameters defined for, indicated by, or associated with a 'Proceed' vehicle control action may indicate route or path information, speed information, an acceleration rate, or a combination thereof, or may expressly or implicitly indicate that a current or previously identified path, speed, acceleration rate, or a combination thereof may be maintained.

In some embodiments, a vehicle control action may be a compound vehicle control action, which may include a sequence, a combination, or both of vehicle control actions. For example, an 'Advance' vehicle control action may indicate a 'Stop' vehicle control action, a subsequent 'Accelerate' vehicle control action associated with a defined acceleration rate, and a subsequent 'Stop' vehicle control action associated with a defined deceleration rate, such that controlling the vehicle in accordance with the 'Advance' vehicle control action includes controlling the vehicle to slowly inch forward a short distance, such as a few inches or a foot.

Identifying the vehicle control action at 4200 may include identifying a primary vehicle control basis. For example, the vehicle control action and the primary vehicle control basis may be received from another system, device, or unit of the vehicle, such as a routing and navigation control unit of the vehicle or an autonomous vehicle operational management controller of the vehicle.

The primary vehicle control basis may indicate a basis, reason, or rationale for the vehicle control action. For example, the vehicle control action may be identified based on multiple vehicle control metrics, each vehicle control metric may be associated with a significance value, such as an immanency metric, an urgency metric, a weight, or a combination thereof, and the vehicle control metric, or combination of metrics, having the greatest, or most significant, significance value may be identified as the primary vehicle control basis.

Vehicle control modification information may be identified at 4300. The vehicle control modification information may indicate one or more vehicle control modification parameters, or vehicle control modifiers, for controlling, or modifying the control of, the vehicle to traverse the vehicle transportation network, or a portion thereof, such that traversing the vehicle transportation network, or a portion thereof, includes outputting a semiotic representation of the vehicle control information, which may include controlling the vehicle to become, or remain, stationary, such as for a defined temporal period. For example, a vehicle control modification parameter may be combined with, or may replace, a performance parameter associated with a vehicle control action for controlling the vehicle in accordance with the vehicle control action.

Each vehicle control modifier may correspond with a respective operational element for controlling the vehicle. A value corresponding to a respective vehicle control modifier may be used to control, or to modify the control, of a respective operational element for controlling the vehicle. For example, the vehicle control action identified at 4200 may include, or may be associated with, one or more performance parameters, and the vehicle control modification information identified at 4300 may include one or more vehicle control modifiers for controlling or modifying respective performance parameters.

Identifying the vehicle control modification information at 4300 may include identifying a vehicle control modification table based on the operational environment information representing the operational environment of the vehicle identified at 4100, the vehicle control action identified at 4200, or both.

For example, the operational environment information representing the operational environment of the vehicle identified at 4100 may include empirical information indicating that weather conditions, or road surface conditions, or both, for the operational environment are dry, empirical information indicating that lighting conditions, such as ambient lighting conditions, for the operational environment are dark, vehicle transportation network information indicating that a residential neighborhood or area is geographically and temporally proximate to the operational environment, external object information indicating an absence of external objects in the current operational environment, external activity information indicating an absence of an external activity for the current operational environment, and user configuration information indicating a preference for minimizing driving time, and a vehicle control modification table may be identified based on the combination of operational environment information (dry, dark, residential, deserted, uneventful, high vehicle control optimization priority), as shown in Table 1.

TABLE 1

| Operational Element (parameter) | Value |
| --- | --- |
| Brightness | 60% |
| Flashing Frequency | 1 Hz |
| Scrolling Speed | 5 ft/s |
| Stopped Threshold | 1 mi/hr |
| States To Show | Yielding, Stopped, Acceleration Imminent |
| Lead time to show Acceleration Imminent | 0.1 s |
| Active Mode Indicator | False |
| States to omit when no other road users are detected | Stopped, Acceleration Imminent |
| Display unchanged state when other road user detected | True |

In Table 1, the parameter 'Brightness' has the value '60%' indicating that the light output of one or more illuminated elements of the vehicle, such as head lamps, tail lights, turn signals, or other external luminous presentation units of the vehicle, may be controlled to output light at 60% of maximum output for traversing a vehicle transportation network, or a portion thereof. Other values may be used.

In Table 1, the parameter 'Flashing Frequency' has the value '1 Hz' indicating that the light output of one or more illuminated elements of the vehicle may be periodically modulated at a frequency of 1 Hertz for traversing a vehicle transportation network, or a portion thereof. Other values may be used.

In Table 1, the parameter 'Scrolling Speed' has the value '5 ft/s' indicating that the output of a semiotic representation, or a portion thereof, using an external luminous presentation unit may be scrolled, or otherwise transitioned in a defined direction, at a defined rate of five feet per second for traversing a vehicle transportation network, or a portion thereof. Other values may be used. Other movement or animation of a semiotic representation may be indicated.

The parameter 'Stopped Threshold' has the value '1 mi/hr' indicating a maximum speed of one mile per hour that may be identified as corresponding to a stopped state. Other values may be used.

The parameter 'States To Show' has the value 'Yielding,' 'Stopped,' 'Acceleration Imminent' indicating vehicle control states for which a semiotic representation may be output for traversing a vehicle transportation network, or a portion thereof. Other values may be used.

The parameter 'Lead time to show Acceleration Imminent' has the value '0.1 s' indicating a lead time, or temporal period, of one tenth of one second for outputting a semiotic representation of an expected or imminent operational maneuver, such as a velocity change for traversing a vehicle transportation network, or a portion thereof, prior to performing the respective operational maneuver. Other values may be used.

The parameter 'Active Mode Indicator' has the value 'False' indicating that traversing a vehicle transportation network, or a portion thereof omits outputting a semiotic representation of an active or current vehicle control mode, such as "Autonomous Driving Mode" and "Active Mode." Other values may be used.

The parameter 'States to omit when no other road users are detected' has the value 'Stopped, Acceleration Imminent' indicating that outputting the semiotic representation for the operational states or vehicle control actions indicated, such as 'Stopped' and 'Acceleration Imminent', may be omitted in response to determining that the operational environment omits relevant external objects for traversing a vehicle transportation network, or a portion thereof. Other values may be used.

The parameter 'Display unchanged state when other road user detected' has the value 'True' indicating that the vehicle may output a semiotic representation of a current operational state in response to determining that the operational environment includes relevant external objects for traversing a vehicle transportation network, or a portion thereof. Other values may be used. For example, the vehicle may omit outputting a semiotic representation of a current operational state in response to a determination that the operational environment omits relevant external objects, and, subsequently, in response to a determination that the operational environment includes relevant external objects, the vehicle may output the semiotic representation of a current operational state.

In another example, the operational environment information representing the operational environment of the vehicle identified at 4100 may include empirical information indicating that weather conditions, or road surface conditions, for the operational environment are dry, empirical information indicating that ambient lighting conditions for the operational environment are bright, vehicle transportation network information indicating that a residential neighborhood or area is geographically and temporally proximate to the operational environment, external object information indicating an absence of external objects in the current operational environment, external activity information indicating an absence of an external activity for the current operational environment, and user configuration information indicating a preference for minimizing driving time, and a vehicle control modification table may be identified based on the combination of operational environment information (dry, day, residential, deserted, uneventful, high vehicle control optimization priority), as shown in Table 2.

TABLE 2

| Operational Element (parameter) | Value |
| --- | --- |
| Brightness | 100% |
| Flashing Frequency | 1 Hz |
| Scrolling Speed | 5 ft/s |
| Stopped Threshold | 1 mi/hr |
| States To Show | Yielding, Stopped, Acceleration Imminent |
| Lead time to show Acceleration Imminent | 0.1 s |
| Active Mode Indicator | False |
| States to omit when no other road users are detected | Stopped, Acceleration Imminent |
| Display unchanged state when other road user detected | True |

Table 1 and Table 2 show examples of Operational Elements (parameters) and corresponding values, however, other Operational Elements (parameters) and other corresponding values may be used.

For example, identifying the vehicle control modification information may include identifying vehicle control modification information for identifying an orientation of the vehicle, or an external object, relative to a portion of the vehicle transportation network, such as an intersection, indicating that the vehicle, or the external object, is currently proceeding through, or is imminently expected to proceed through, the portion of the vehicle transportation network.

In another example, identifying the vehicle control modification information may include identifying vehicle control modification information for identifying whether outputting the semiotic representation may include outputting a portion of the semiotic representation based on a type of an external object, a relative orientation of an external object, or a combination of a type of an external object and a relative orientation of the external object.

In another example, identifying the vehicle control modification information may include identifying vehicle control modification information for identifying distance parameters, velocity parameters, acceleration rate parameters, or other control parameters for traversing a portion of the vehicle transportation network in accordance with an 'Advance' vehicle control action by controlling the vehicle to traverse the vehicle transportation network, or a portion thereof, by slowly inching forward a short distance as indicated by the identified parameters.

In another example, identifying the vehicle control modification information may include identifying vehicle control modification information for identifying a relative lateral orientation of the vehicle with respect to a current lane for outputting a semiotic representation of traversing the vehicle transportation network in accordance with a 'Turn' vehicle control action corresponding to controlling the vehicle to turn from the current lane onto an intersecting road.

In another example, identifying the vehicle control modification information may include identifying vehicle control modification information for identifying a speed, or acceleration or deceleration rate, for controlling the vehicle to traverse a portion of the vehicle transportation network that includes a change in direction along a defined radius.

In another example, identifying the vehicle control modification information may include identifying vehicle control modification information for identifying a steering angle for controlling the wheels of a stationary vehicle for traversing a portion of the vehicle transportation network in accordance with a 'Turn' vehicle control action such that a semiotic representation output by controlling the steering angle of the wheels corresponds with controlling the vehicle to traverse the portion of the vehicle transportation network in accordance with the 'Turn vehicle control action.

In another example, identifying the vehicle control modification information may include identifying vehicle control modification information for identifying a spatial, temporal, or spatiotemporal distance for controlling the vehicle to traverse the vehicle transportation network such that a distance between the vehicle and an immediately adjacent external object, such as a remote vehicle, ahead of, such as along an expected path of the vehicle, is the identified distance.

In another example, identifying the vehicle control modification information may include identifying vehicle control modification information for identifying a spatial, temporal, or spatiotemporal distance for controlling the vehicle to traverse a portion of the vehicle transportation network by decelerating prior to turning in accordance with a 'Turn' vehicle control action such that controlling the vehicle to traverse the portion of the vehicle transportation network by decelerating prior to turning in accordance with the 'Turn' vehicle control action includes outputting a semiotic representation of controlling the vehicle to traverse the portion of the vehicle transportation network in accordance with the 'Turn' vehicle control action at the identified distance prior to controlling the vehicle to traverse the portion of the vehicle transportation network by turning in accordance with the 'Turn' vehicle control action.

In another example, identifying the vehicle control modification information may include identifying vehicle control modification information for identifying one or more parameters for controlling the vehicle to traverse a portion of the vehicle transportation network proximate to an indirect vehicle operational environment condition such that controlling the vehicle to traverse the portion of the vehicle transportation network proximate to the indirect vehicle operational environment condition includes controlling the vehicle to output a semiotic representation of the indirect vehicle operational environment condition or of a probable effect of the indirect vehicle operational environment condition. For example, the indirect vehicle operational environment condition may be a condition of a portion of the vehicle transportation network adjacent or proximate to the portion of the vehicle transportation network traversed by the vehicle that is omitted from the portion of the vehicle transportation network traversed by the vehicle and that has an identified probability of affecting the operation of the vehicle, or an external object within the portion of the vehicle transportation network, such as a slow traffic condition in a lane adjacent to a current lane of the vehicle.

Identifying the vehicle control modification information at 4300 may include reading the values corresponding to the operational elements from the identified vehicle control modification table as the vehicle control modification information.

Identifying the vehicle control modification information at 4300 may omit identifying a vehicle control modification table and may include identifying vehicle control modifiers based on the operational environment information representing the operational environment of the vehicle identified at

4100, the vehicle control action identified at 4200, or both. For example, a vehicle control modifier may correspond with a respective aspect of the operational environment may be identified for a respective operational element or vehicle control action performance parameter.

Identifying vehicle control modifiers based on the operational environment information representing the operational environment of the vehicle identified at 4100 may include identifying the vehicle control modifiers using Boolean values for the aspects of the operational environment.

For example, the operational environment information representing the operational environment of the vehicle identified at 4100 may include empirical information indicating that weather conditions, or road surface conditions, for the operational environment are wet or rainy, empirical information indicating that ambient lighting conditions for the operational environment are bright (day), vehicle transportation network information indicating that a commercial neighborhood or area is geographically and temporally proximate to the operational environment, external object information indicating at least one pedestrian external object in the current operational environment, external activity information indicating an absence of an external activity for the current operational environment (uneventful), and user configuration information indicating a preference for minimizing driving time (high vehicle control optimization priority). Identifying the vehicle control modification information at 4300 may include identifying a vehicle control modifier, or a value thereof, for the parameter 'Lead time to show Acceleration Imminent' (L) based on the empirical information indicating wet or rainy weather conditions, such as +0.3 seconds, which may be expressed as 'If(weather=rain): L+=0.3 s'. Identifying the vehicle control modification information at 4300 may include identifying a vehicle control modifier, or a value thereof, for the parameter 'Lead time to show Acceleration Imminent' (L) based on the empirical information indicating daylight conditions, such as +0 seconds, which may be expressed as 'If(light=day): L+=0 s'. Identifying the vehicle control modification information at 4300 may include identifying a vehicle control modifier, or a value thereof, for the parameter 'Lead time to show Acceleration Imminent' (L) based on the vehicle transportation network information indicating a commercial area, such as −0.1 seconds, which may be expressed as 'If(area=commercial): L−=0.1 s'. Identifying the vehicle control modification information at 4300 may include identifying a vehicle control modifier, or a value thereof, for the parameter 'Lead time to show Acceleration Imminent' (L) based on the external object information indicating the presence of a pedestrian in the current operational environment, such as +0.1 seconds, which may be expressed as 'If(pedestrians=true): L+=0.1 s'. Identifying the vehicle control modification information at 4300 may include identifying a vehicle control modifier, or a value thereof, for the parameter 'Lead time to show Acceleration Imminent' (L) based on the external activity information indicating the uneventful conditions, such as +0 seconds, which may be expressed as 'If(uneventful): L+=0 s'. Identifying the vehicle control modification information at 4300 may include identifying a vehicle control modifier, or a value thereof, for the parameter 'Lead time to show Acceleration Imminent' (L) based on the user configuration information indicating high vehicle control optimization priority, such as −0.05 seconds, which may be expressed as 'If(high optimization): L−=0.05 s'.

In another example, the operational environment information representing the operational environment of the vehicle identified at 4100 may include empirical information indicating that weather conditions, or road surface conditions, for the operational environment are wet or rainy, empirical information indicating that ambient lighting conditions for the operational environment are dark (night), vehicle transportation network information indicating that a rural neighborhood or area is geographically and temporally proximate to the operational environment, external object information indicating no external objects are in the current operational environment, external activity information indicating a concert for the current operational environment (eventful), and user configuration information indicating a preference for courteous driving (low vehicle control optimization priority). Identifying the vehicle control modification information at 4300 may include identifying a vehicle control modifier, or a value thereof, for the parameter 'Lead time to show Acceleration Imminent' (L) based on the empirical information indicating wet or rainy weather conditions, such as +0.3 seconds, which may be expressed as 'If(weather=rain): L+=0.3 s'. Identifying the vehicle control modification information at 4300 may include identifying a vehicle control modifier, or a value thereof, for the parameter 'Lead time to show Acceleration Imminent' (L) based on the empirical information indicating dark conditions, such as +0.1 seconds, which may be expressed as 'If(night): L+=0.1 s'. Identifying the vehicle control modification information at 4300 may include identifying a vehicle control modifier, or a value thereof, for the parameter 'Lead time to show Acceleration Imminent' (L) based on the vehicle transportation network information indicating a rural area, such as +0.1 seconds, which may be expressed as 'If(rural): L+=0.1 s'. Identifying the vehicle control modification information at 4300 may include identifying a vehicle control modifier, or a value thereof, for the parameter 'Lead time to show Acceleration Imminent' (L) based on the external object information indicating the absence of external objects in the current operational environment, such as −0.15 seconds, which may be expressed as 'If(deserted): L−=0.15 s'. Identifying the vehicle control modification information at 4300 may include identifying a vehicle control modifier, or a value thereof, for the parameter 'Lead time to show Acceleration Imminent' (L) based on the external activity information indicating the concert, such as +0.2 seconds, which may be expressed as 'If(eventful): L+=0.2 s'. Identifying the vehicle control modification information at 4300 may include identifying a vehicle control modifier, or a value thereof, for the parameter 'Lead time to show Acceleration Imminent' (L) based on the user configuration information indicating low vehicle control optimization priority, such as +0.05 seconds, which may be expressed as 'If(low optimization): L+=0.05 s'.

Identifying vehicle control modifiers based on the operational environment information representing the operational environment of the vehicle identified at 4100 may include identifying the vehicle control modifiers using discrete or numeric values for the aspects of the operational environment.

For example, the operational environment information representing the operational environment of the vehicle identified at 4100 may include empirical information indicating sensor information from an external light sensor of the vehicle, such as illumination sensor information (IL) indicating $10^5$ luminous flux per unit area (lux), and identifying the vehicle control modification information at 4300 may include identifying a vehicle control modifier, or a value thereof, for the parameter 'Lead time to show Acceleration Imminent' (L) as a function ($\Delta L_{light}$) of the empirical information indicating the illumination sensor information (IL), which may be expressed as the following:

$$\Delta L_{light} = \log(IL)/50 + 1/10. \quad \text{[Equation 1]}$$

In another example, the operational environment information representing the operational environment of the vehicle identified at 4100 may include empirical information indicating sensor information from a rain sensor of the vehicle, such as sensor information indicating a percentage of illuminance (PIR), such as 100%, and identifying the vehicle control modification information at 4300 may include identifying a vehicle control modifier, or a value thereof, for the parameter 'Lead time to show Acceleration Imminent' (L) as a function ($\Delta L_{rain}$) of the empirical information indicating the percentage of illuminance (PIR) from the rain sensor, which may be expressed as the following:

$$\Delta L_{rain} = (1-PIR)*1.2. \quad \text{[Equation 2]}$$

A vehicle control modifier may indicate a constraint, such as a minimum value, a maximum value, or a range of values, for an operational element. For example, the operational environment information representing the operational environment of the vehicle identified at 4100 may include vehicle transportation network information indicating that a school, or school zone, is geographically and temporally proximate, such as included in, adjacent to, or overlapping, to the operational environment, and identifying the vehicle control modification information at 4300 may include identifying a vehicle control constraint, or a value thereof, for the parameter 'Lead time to show Acceleration Imminent' (L) based on the vehicle transportation network information indicating a school zone, such as =1.2 seconds, which may be expressed as 'If(school): L>=1.2 s'.

In some embodiments, a vehicle control modifier may indicate a conditional constraint, such as a minimum value, a maximum value, or a range of values, for a combination of operational elements. For example, the operational environment information representing the operational environment of the vehicle identified at 4100 may include vehicle transportation network information indicating that the operational environment includes a residential neighborhood, empirical information indicating a dark or nighttime illumination state, external object information indicating an absence of external objects, and external activity information indicating an absence of external activities, and identifying the vehicle control modification information at 4300 may include identifying a vehicle control conditional constraint, or a value thereof, for the parameter 'Lead time to show Acceleration Imminent' (L) based on the vehicle transportation network information indicating a combination of a residential neighborhood, a dark illumination state, a deserted state, and an uneventful state, such as =1.0 seconds, which may be a maximum constraint and which may be expressed as 'If(residential, dark, deserted, uneventful): L<=1.0 s'.

In some embodiments, multiple conditional constraints may be identified based on one or more aspects of the operational environment information and the conditional constraint corresponding to the largest cardinality of aspects may be identified as the operative conditional constraint. For example, the operational environment information representing the operational environment of the vehicle identified at 4100 may include vehicle transportation network information indicating that the operational environment includes a residential neighborhood, vehicle transportation network information indicating that a school, or school zone, is geographically and temporally proximate, such as included in, adjacent to, or overlapping, to the operational environment, empirical information indicating a dark or nighttime illumination state, external object information indicating an absence of external objects, and external activity information indicating an absence of external activities, and identifying the vehicle control modification information at 4300 may include identifying a first vehicle control conditional constraint, or a value thereof, for the parameter 'Lead time to show Acceleration Imminent' (L) based on the vehicle transportation network information indicating a combination of a residential neighborhood, a dark illumination state, a deserted state, and an uneventful state, such as =1.0 seconds, which may be a maximum constraint and which may be expressed as 'If(residential, dark, deserted, uneventful): L<=1.0 s', identifying a second vehicle control conditional constraint, or a value thereof, for the parameter 'Lead time to show Acceleration Imminent' (L) based on the vehicle transportation network information indicating a combination of a residential neighborhood, a school zone, a dark illumination state, a deserted state, and an uneventful state, such as =1.2 seconds, which may be a minimum constraint and which may be expressed as 'If(residential, school, dark, deserted, uneventful): L>=1.2 s', and the second conditional constraint may be identified as the operative conditional constraint.

Although identifying vehicle control modifiers is described herein for the parameter 'Lead time to show Acceleration Imminent' (L), other vehicle control modifier values may be used and other vehicle control modifiers may be identified based on the operational environment information for other operational elements.

In an example, the vehicle control modification information may indicate one or more parameters for controlling the information output as a semiotic representation. For example, one or more parameters for controlling the amount, or density, of information output as a semiotic representation may be based on the modalities available for the vehicle to output the semiotic representation.

Vehicle control information may be identified at 4400. Identifying the vehicle control information at 4400 may include identifying the vehicle control information based on the vehicle control action identified at 4200, the vehicle control modification information identified at 4300, or both. For example, the vehicle control modification information identified at 4300 may include vehicle control modifiers, and identifying the vehicle control information at 4400 may include identifying the vehicle control information based on the vehicle control modifiers.

Identifying the vehicle control information at 4400 may include identifying defined vehicle control information for controlling the vehicle to traverse the vehicle transportation network. The defined vehicle control information may include values for respective operational elements or performance parameters for controlling the vehicle to traverse the vehicle transportation network. The defined vehicle control information may be independent of the operational environment. For example, the defined vehicle control information may include a defined value, such as 0.25 seconds, for the parameter 'Lead time to show Acceleration Imminent' (L).

Identifying the defined vehicle control information may include identifying the defined vehicle control information, or a portion thereof, based on a current operational state of the vehicle, based on the vehicle control action identified at 4200, the primary vehicle control basis identified at 4200, based on a defined data source, such as a look-up table, or based on a combination of one or more of the current operational state of the vehicle, the vehicle control action identified at 4200, the primary vehicle control basis identified at 4200, and the defined data source.

Identifying the vehicle control information at 4400 may include identifying a combination of the defined vehicle control information and the vehicle control modification information identified at 4300. For example, identifying the vehicle control information at 4400 may include updating or modifying one or more values from the defined vehicle control information based on corresponding values from the vehicle control modification information.

The vehicle control modification information identified at 4300 may omit constraints and identifying the vehicle control information at 4400 may include identifying, for each operational element, a sum of the defined vehicle control information for the respective operational element and each vehicle control modifier for the respective operational element, as the corresponding vehicle control information.

In an example, the operational environment information representing the operational environment of the vehicle identified at 4100 may include empirical information indicating that weather conditions, or road surface conditions, for the operational environment are wet or rainy, empirical information indicating that ambient lighting conditions for the operational environment are bright (day), vehicle transportation network information indicating that a commercial neighborhood or area is geographically and temporally proximate to the operational environment, external object information indicating at least one pedestrian external object in the current operational environment, external activity information indicating an absence of an external activity for the current operational environment (uneventful), and user configuration information indicating a preference for minimizing driving time (high vehicle control optimization priority). For the parameter 'Lead time to show Acceleration Imminent' (L), the vehicle control modification information identified at 4300 may include a vehicle control modifier based on the empirical information indicating wet or rainy weather conditions, such as +0.3 seconds; a vehicle control modifier based on the empirical information indicating daylight conditions, such as +0 seconds; a vehicle control modifier based on the vehicle transportation network information indicating a commercial area, such as −0.1 seconds; a vehicle control modifier based on the external object information indicating the presence of a pedestrian in the current operational environment, such as +0.1 seconds; a vehicle control modifier based on the external activity information indicating the uneventful conditions, such as +0 seconds; and a vehicle control modifier based on the user configuration information indicating high vehicle control optimization priority, such as −0.05 seconds. Identifying the vehicle control information at 4400 may include identifying defined vehicle control information for the parameter 'Lead time to show Acceleration Imminent' (L) indicating a primary value of 0.25 second, and may include, for the parameter 'Lead time to show Acceleration Imminent' (L), identifying a sum of the primary value, 0.25 s, and the respective vehicle control modifiers, +0, +0.3, −0.1, +0.1, −0.05, as the vehicle control information for the parameter 'Lead time to show Acceleration Imminent' (L), which may be expressed as the following:

$$L=\Sigma(0.25,0,0.3,-0.1,0.1,-0.05)=0.5. \quad \text{[Equation 3]}$$

In another example, the operational environment information representing the operational environment of the vehicle identified at 4100 may include empirical information indicating that weather conditions, or road surface conditions, for the operational environment are wet or rainy, empirical information indicating that ambient lighting conditions for the operational environment are dark (night), vehicle transportation network information indicating that a rural neighborhood or area is geographically and temporally proximate to the operational environment, external object information indicating no external objects are in the current operational environment, external activity information indicating a concert for the current operational environment (eventful), and user configuration information indicating a preference for courteous driving (low vehicle control optimization priority). For the parameter 'Lead time to show Acceleration Imminent' (L), the vehicle control modification information identified at 4300 may include a vehicle control modifier based on the empirical information indicating wet or rainy weather conditions, such as +0.3 seconds; a vehicle control modifier based on the empirical information indicating night conditions, such as +0.1 seconds; a vehicle control modifier based on the vehicle transportation network information indicating a rural area, such as +0.1 seconds; a vehicle control modifier based on the external object information indicating the absence of external objects in the current operational environment, such as −0.15 seconds; a vehicle control modifier based on the external activity information indicating the eventful conditions, such as +0.2 seconds; and a vehicle control modifier based on the user configuration information indicating low vehicle control optimization priority, such as +0.05 seconds. Identifying the vehicle control information at 4400 may include identifying defined vehicle control information for the parameter 'Lead time to show Acceleration Imminent' (L) indicating a primary value of 0.25 second, and may include, for the parameter 'Lead time to show Acceleration Imminent' (L), identifying a sum of the primary value, 0.25 s, and the respective vehicle control modifiers, +0.1, +0.3, +0.1, −0.15, +0.2, +0.05, as the vehicle control information for the parameter 'Lead time to show Acceleration Imminent' (L), which may be expressed as the following:

$$L=\Sigma(0.25,0.1,0.3,0.1,-0.15,0.2,0.05)=0.85. \quad \text{[Equation 4]}$$

The vehicle control modification information identified at 4300 may include a constraint and identifying the vehicle control information at 4400 may include identifying, for operational elements corresponding to the constraint, a sum of the defined vehicle control information for the respective operational element and each vehicle control modifier for the respective operational element, determining whether the sum is consistent with the constraint, and determining whether to use the sum as the corresponding vehicle control information or to use the constraint as the corresponding vehicle control information. For example, the sum may be consistent with the constraint and the sum may be used as the corresponding vehicle control information. In another example, the sum may be inconsistent with the constraint and the constraint may be used as the corresponding vehicle control information.

In an example, the constraint may be a minimum value constraint, the sum may be at least the constraint, such as equal to or greater than, and the sum may be used as the corresponding vehicle control information. In another example, the constraint may be a maximum value constraint, the sum may be within the constraint, such as less than, and the sum may be used as the corresponding vehicle control information. In some embodiments, determining the sum may be omitted and the constraint may be used as the corresponding vehicle control information.

In an example, the operational environment information representing the operational environment of the vehicle identified at 4100 may include empirical information indicating that weather conditions, or road surface conditions, for the operational environment are wet or rainy, empirical information indicating that ambient lighting conditions for the operational environment are bright (day), vehicle transportation network information indicating that a school zone is geographically and temporally proximate to the operational environment, external object information indicating at least one pedestrian external object in the current operational environment, external activity information indicating an absence of an external activity for the current operational environment (uneventful), and user configuration information indicating a preference for minimizing driving time (high vehicle control optimization priority). For the parameter 'Lead time to show Acceleration Imminent' (L), the vehicle control modification information identified at 4300 may include a vehicle control modifier based on the empirical information indicating wet or rainy weather conditions, such as +0.3 seconds; a vehicle control modifier based on the empirical information indicating daylight conditions, such as +0 seconds; a vehicle control modifier constraint based on the vehicle transportation network information indicating a school zone, such as >=1.2 seconds; a vehicle control modifier based on the external object information indicating the presence of a pedestrian in the current operational environment, such as +0.1 seconds; a vehicle control modifier based on the external activity information indicating the uneventful conditions, such as +0 seconds; and a vehicle control modifier based on the user configuration information indicating high vehicle control optimization priority, such as −0.05 seconds. Identifying the vehicle control information at 4400 may include identifying defined vehicle control information for the parameter 'Lead time to show Acceleration Imminent' (L) indicating a primary value of 0.25 second, determining that, for the parameter 'Lead time to show Acceleration Imminent' (L), the vehicle control modification information identified at 4300 includes the school zone constraint, and identifying the value of the school zone constraint, 1.2 seconds, as the vehicle control information for the parameter 'Lead time to show Acceleration Imminent' (L).

Although not shown separately in FIG. 4, in some embodiments, identifying the vehicle control modification information at 4300, identifying the vehicle control information at 4400, or both, may include identifying vehicle control modification weights and identifying the vehicle control information at 4400 may include identifying the vehicle control information using the vehicle control modification weights. The vehicle control modification weights may indicate a weighting for a current vehicle control state relative to a corresponding modified vehicle control state such that controlling the vehicle to traverse the vehicle transportation network by transitioning from the current vehicle control state to the modified vehicle control state includes controlling the vehicle to transition from the current vehicle control state to the modified vehicle control state over a defined period such that a rate of change for the corresponding vehicle control element is within a threshold indicated by the vehicle control information.

The vehicle may traverse the vehicle transportation network, or a portion thereof, at 4500. Traversing the vehicle transportation network, or a portion thereof, at 4500 may include traversing the vehicle transportation network, or a portion thereof, in accordance with the vehicle control information identified at 4400. Traversing the vehicle transportation network, or a portion thereof, at 4500 in accordance with the vehicle control information identified at 4400 may include controlling the vehicle to traverse the vehicle transportation network, or the portion thereof, based on the vehicle control information.

In some embodiments, traversing the vehicle transportation network, or a portion thereof, at 4500 in accordance with the vehicle control information identified at 4400 may include outputting, sending, transmitting, or otherwise providing the vehicle control information to another system, device, or unit of the vehicle, such as a routing and navigation control unit of the vehicle or an autonomous vehicle operational management controller of the vehicle such that the other system, device, or unit controls the vehicle to traverse the vehicle transportation network, or the portion thereof, in accordance with the vehicle control information.

For example, traversing the vehicle transportation network, or a portion thereof, at 4500 may include generating combined vehicle control information by supplementing or modifying the non-semiotic vehicle control action identified at 4200 based on the vehicle control information identified at 4400, such as by modifying a performance parameter for the vehicle control action based on corresponding vehicle control information identified at 4400, and controlling the vehicle to traverse the vehicle transportation network, or the portion thereof, in accordance with the combined vehicle control information.

Traversing the vehicle transportation network, or a portion thereof, at 4500 may include outputting a semiotic representation of the vehicle control information at 4510. Traversing the vehicle transportation network, or a portion thereof, at 4500 may include performing or executing one or more semiotic vehicle control operations by controlling, or modifying the control of, the vehicle to traverse the vehicle transportation network, or a portion thereof, such that traversing the vehicle transportation network, or a portion thereof, includes outputting a semiotic representation of the vehicle control information at 4510. Although not shown expressly in FIG. 4, traversing the vehicle transportation network, or a portion thereof, at 4500 may include performing or implementing one or more non-semiotic vehicle control operations or actions.

Traversing the vehicle transportation network, or a portion thereof, at 4500 in accordance with vehicle control information may include performing or executing a combination of vehicle control operations or actions, or a sequence or series of vehicle control operations or actions, or combinations of vehicle control operations or actions.

The vehicle control operations may include semiotic vehicle control operations, and traversing the vehicle transportation network, or a portion thereof, in accordance with semiotic vehicle control information or a semiotic vehicle control operation, controlling the vehicle to perform or execute a semiotic vehicle operation, or otherwise performing or executing a semiotic vehicle operation may include signaling, presenting, displaying, performing, or otherwise outputting a semiotic representation of the vehicle control information, which may include a meaningful expression or communication of the vehicle control information, or a portion thereof, or of information indicative of the vehicle control information, or a portion thereof.

The vehicle control operations may include non-semiotic vehicle control operations, and traversing the vehicle transportation network, or a portion thereof, in accordance with non-semiotic vehicle control information or a non-semiotic vehicle control operation, controlling the vehicle to perform or execute a non-semiotic vehicle operation, or otherwise performing or executing a non-semiotic vehicle operation may include controlling or operating the vehicle independent of outputting a semiotic representation.

Outputting the semiotic representation of the vehicle control information may include controlling one or more signaling or communication modalities of the vehicle to output the semiotic representation of the vehicle control information, or a portion thereof. In some embodiments, identifying the vehicle control modification information at 4300 may include identifying the available modalities of the vehicle for outputting the semiotic representation of the vehicle control information and identifying the vehicle control modification information based on the available modalities. For example, the modalities available for the vehicle to output the semiotic representation, or output devices, may include one or more external luminous presentation units, one or more external aural presentation units, one or more electronic communication network control units, one or more velocity, kinetic state, or motion control units, or a combination thereof. Other modalities may be used.

Outputting the semiotic representation of the vehicle control information at 4510 may include controlling an external luminous presentation unit, or a combination of external luminous presentation units, of the vehicle to output at least a portion of the semiotic representation of the vehicle control information. An external luminous presentation unit may be, for example, one or more headlights, taillights, turn signals, individual lights, groups of lights, such as light bars, light strips, light emitting diode (LED) strips, color-changing light strips, on-vehicle graphic displays, image projectors, augmented reality devices, text displays, or any other unit or device capable of outputting any portion of the semiotic representation of the vehicle control information through the control or manipulation of light. For example, controlling the external luminous presentation unit may include controlling a brightness or luminance of the external luminous presentation unit, controlling a color or combination of colors of the external luminous presentation unit, controlling a direction of output of the external luminous presentation unit, controlling an output frequency, rate, timing, or period of the external luminous presentation unit, controlling motion of the luminous output or the external luminous presentation unit, controlling a pattern of the luminous output, controlling an animation of the luminous output, or otherwise modulate the output of the external luminous presentation unit, controlling the external luminous presentation unit to display, or otherwise output, text, graphics, or a combination thereof, controlling the external luminous presentation unit to animate the output of the external luminous presentation unit, or any combination thereof.

Outputting the semiotic representation of the vehicle control information at 4510 may include controlling an external aural presentation unit, or a combination of external aural presentation units, of the vehicle to output at least a portion of the semiotic representation of the vehicle control information. An external aural presentation unit may be, for example, a horn, a speaker, or any other unit or device capable of outputting any portion of the semiotic representation of the vehicle control information through the control or manipulation of sound. For example, controlling the external aural presentation unit may include controlling a frequency, tone, phase, or amplitude of the external luminous presentation unit, which may include controlling the external luminous presentation unit to output a sequence or series of sounds.

Outputting the semiotic representation of the vehicle control information at 4510 may include controlling an electronic communication network control unit of the vehicle to output information indicating at least a portion of the semiotic representation of the vehicle control information, such as by outputting, sending, broadcasting, or transmitting an electronic communication signal via an electronic communication medium to an external device, such as a remote vehicle or an infrastructure device.

Outputting the semiotic representation of the vehicle control information at 4510 may include controlling a velocity control unit, which may include controlling a directional state control unit of the vehicle, a kinetic state control unit of the vehicle, or both, to output at least a portion of the semiotic representation of the vehicle control information.

Controlling a directional state control unit, such as a steering unit, of the vehicle to output at least a portion of the semiotic representation of the vehicle control information may include controlling the directional state control unit to control, or alter, a directional state of the vehicle, such as by turning or steering the vehicle, such that at least a portion of the semiotic representation of the vehicle control information is output. Controlling the directional state may include maintaining a current directional state such that at least a portion of the semiotic representation of the vehicle control information is output.

Controlling a kinetic state control unit, such as an accelerator or a braking unit, of the vehicle to output at least a portion of the semiotic representation of the vehicle control information may include controlling the kinetic state control unit to control, or alter, a kinetic state of the vehicle, such as by accelerating or decelerating the vehicle, such that at least a portion of the semiotic representation of the vehicle control information is output. Controlling the kinetic state may include maintaining a current kinetic state such that at least a portion of the semiotic representation of the vehicle control information is output.

Outputting the semiotic representation of the vehicle control information at 4510 may include outputting a semiotic representation of at least a portion of an operational state of the vehicle concurrent with traversing the vehicle transportation network, or a portion thereof, at 4512, outputting a semiotic representation of the primary vehicle control basis at 4514, or a combination thereof.

Outputting a semiotic representation of an operational state of the vehicle concurrent with traversing the vehicle transportation network, or a portion thereof, at 4512, may include outputting a semiotic representation of a current operational state of the vehicle, outputting a semiotic representation of an expected operational state of the vehicle, or a combination thereof.

For example, the current operational state of the vehicle may be accelerating from a stationary state through an intersection, and outputting the semiotic representation of the current operational state of the vehicle may include outputting a semiotic representation indicating that the vehicle is proceeding, or accelerating, through the intersection.

In another example, the current operational state of the vehicle may be stationary at an intersection, the expected, imminent, or probable, operational state of the vehicle, which may be associated with a temporal location, such as a temporally proximate future temporal location, may be accelerating through the intersection, and outputting the semiotic representation of the expected operational state of the vehicle may include outputting a semiotic representation indicating that the expected, imminent, or probable temporally proximate future velocity of the vehicle is proceeding, or accelerating, through the intersection. An expected, probable, or projected operational state of the vehicle may be an imminent, expected, probable, or projected operational state of the vehicle at a temporally proximate future temporal location subsequent to or concurrent with controlling the vehicle to perform an identified vehicle control operation or action, or a sequence or combination thereof.

Temporally prior to, or concurrent with, controlling the vehicle to perform an identified vehicle control operation or action, or a sequence or combination of identified vehicle control operations or actions, the identified vehicle control operation or action, or sequence or combination of identified vehicle control operations or actions, or the imminent, expected, probable, or projected operational state of the vehicle at a temporally proximate future temporal location subsequent to, or concurrent with, controlling the vehicle to perform the identified vehicle control operation or action, or the sequence or combination of identified vehicle control operations or actions, may be referred to herein as the intent or intention of the vehicle and the semiotic representation of the vehicle control information indicating the identified vehicle control operation or action, or the sequence or combination of identified vehicle control operations or actions, may be referred to herein as the intent or intention indicator or indication.

Outputting a semiotic representation of the primary vehicle control basis at 4514 may include generating an indication or representation, which may be referred to herein as a rationale indication or indicator, of the primary vehicle control basis identified at 4100 based on the vehicle control information identified at 4400.

Other implementations of interactive external vehicle-user communication with integrated semiotic control may be used. For example, one or more of identifying operational environment information at 4100, identifying a vehicle control action at 4200, identifying vehicle control modification information at 4300, identifying vehicle control information at 4400, controlling the vehicle to traverse the vehicle transportation network, or a portion thereof, at 4500 may be combined or performed concurrently or in parallel.

In some embodiments, identifying the vehicle control modification information at 4300 may include determining that a probability of ambiguity for outputting the semiotic representation exceeds a defined ambiguity threshold and identifying the vehicle control modification information to minimize the probability of ambiguity.

For example, identifying the operational environment information at 4100 may include determining that the vehicle is traversing a highway approaching a series of two or more exit ramps in relatively close proximity. Identifying the vehicle control action at 4200 may include identifying an 'Exit' vehicle control action for exiting at a sequentially second exit ramp. Identifying the vehicle control modification information at 4300 may include identifying signal timing modifiers extending or increasing a signal timing parameter for outputting a semiotic representation of the 'Exit' vehicle control action such that outputting the semiotic representation of the 'Exit' vehicle control action as modified by the signal timing parameter may include outputting at least a portion of the semiotic representation of the 'Exit' vehicle control action as modified by the signal timing parameter substantially prior to passing a sequentially first exit ramp, and a probability of ambiguity for outputting the portion of the semiotic representation of the 'Exit' vehicle control action as modified by the signal timing parameter substantially prior to passing the sequentially first exit ramp may exceed the defined ambiguity threshold which may indicate a determined probability that outputting the portion of the semiotic representation of the 'Exit' vehicle control action as modified by the signal timing parameter substantially prior to passing the sequentially first exit ramp may communicate an indication that the imminent or expected path for the vehicle includes traversing the first exit ramp.

Minimizing the probability of ambiguity may include identifying vehicle control modifiers that reduce, minimize, or eliminate the probability that outputting the portion of the semiotic representation of the 'Exit' vehicle control action as modified by the signal timing parameter may communicate an indication that the imminent or expected path for the vehicle includes traversing the first exit ramp.

In some embodiments, the vehicle control modification information identified at 4300, the defined vehicle control information identified at 4400, or both may be based in part on one or more regional factors. For example, identifying the vehicle control modification information at 4300, identifying the defined vehicle control information at 4400, or both may include adjusting or weighting the respective information based on one or more regional factors. The regional factors may indicate modifications to outputting semiotic representations based on a relatively large geospatial area, such as a geospatial area extending multiples of the current operational environment beyond the current operational environment.

Figure 5:
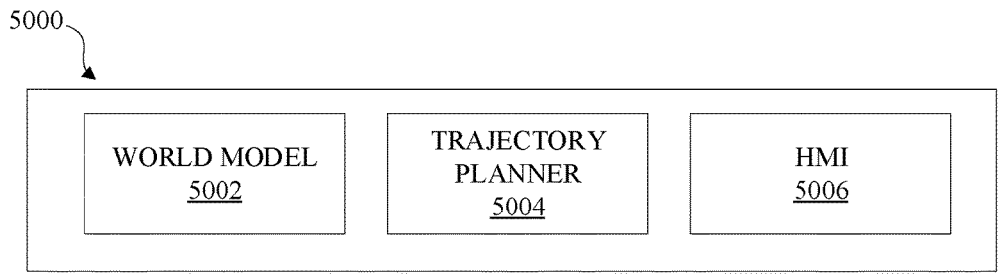
FIG. 5 is a diagram of a system for interactive external vehicle-user communication in accordance with implementations of this disclosure.

FIG. 5 is a diagram of a system 5000 for interactive external vehicle-user communication in accordance with implementations of this disclosure. The system 5000 may be implemented by, or integrated in, a vehicle, such as the vehicle 1000 shown in FIG. 1 or one of the vehicles 2100/2110 shown in FIG. 2, which may be an autonomous vehicle, a semi-autonomous vehicle, or any other vehicle implementing autonomous driving. One or more modules of the system 5000 may be stored in, and/or may execute instructions stored in, a memory of the vehicle, such as the memory 1340 of FIG. 1.

The system 5000 may include a world model module 5002, a trajectory planner module 5004, and a human-machine interface module (HMI) 5006. Some embodiments may include fewer, more, or other modules. In some embodiments, the features described below with respect to some of the modules may be implemented, at least partially, by other modules. In some embodiments, some of the modules may be combined. In some embodiments, one of more of modules may be divided into other modules.

The world model module 5002 may maintain and track external object information, such as the external object information described with respect to FIG. 4. The world model module 5002 may receive sensor data, such as from the sensor 1360 of FIG. 1, and may determine (e.g., convert to, detect, etc.) external objects from the sensor data. That is, for example, the world model module 5002 may determine external objects, including other road users, from the received sensor data. In an illustrative example, the world model module 5002 may convert a point cloud received from a light detection and ranging (LiDAR) sensor (i.e., a sensor of the sensor 126) into an object (e.g., an external user). Sensor data from several sensors may be fused together to determine (e.g., guess the classification of) the external objects. Examples of object classifications may include a bicycle, a pedestrian, a vehicle, etc.

The world model module 5002 may receive sensor information, which the world model module 5002 may use to calculate and maintain additional information for at least some of the detected objects. For example, the world model module 5002 may maintain a state for at least some of the determined objects. For example, the state for an object may include zero or more of a velocity, a pose, a geometry (such as width, height, and depth), a classification (e.g., bicycle, large truck, pedestrian, road sign, etc.), and a location. As such, the state of an object includes discrete state information (e.g., classification) and continuous state information (e.g., pose and velocity).

For example, with respect to a pedestrian, the state information may include more, fewer, other than head position information, torso orientation, eye gaze information, and the like. The world model module 5002 may maintain a pose, which may include a torso orientation, hand movements, hip positions, eye movements, head orientation, more, fewer, or other body movements.

The world model module 5002 may fuse sensor information, may track objects, may maintain lists of hypotheses for at least some of the external objects (e.g., an object A might be going straight, turning right, or turning left), may create and may maintain predicted trajectories for each hypothesis, and may maintain likelihood estimates of each hypothesis (e.g., object A is going straight with probability 90% considering the object pose/velocity and the trajectory poses/velocities).

In an example, the world model module 5002 uses instances of the trajectory planner module 5004 to generate a respective reference driveline for each object hypothesis for at least some of the external objects. For example, one or more instances of the trajectory planner may be used to generate reference drivelines for vehicles, bicycles, and pedestrians. In another example, an instance of the trajectory planner may be used to generate reference drivelines for vehicles and bicycles, and a different method may be used to generate reference drivelines (e.g., references paths) for pedestrians. As mentioned above, interactive external vehicle-user communication may include determining or tracking an expected path of an external object (e.g., that the external object is currently proceeding through, or is imminently expected to proceed through, a portion of the vehicle transportation network). The expected path may be a hypothesis that is associated with the external object. State information associated with the external object (such as the orientation of the external object) may be state information associated with a hypothesis.

The world model module may continuously receive observations (e.g., sensor data). For a given observation, the world model module may determine the external object that the observation is associated with. If an associated external object is found, then the state of each of the hypotheses associated with the external object may be updated based on the observation. That is, for example, the predicted location of the external object is updated based on the previously predicted location and the based on the observation received from the real (e.g., physical) world. That is, previous predictions (e.g., of future state information, including future locations, of an external object) may be combined with sensor observations to update the predictions.

The trajectory planner module 5004 may receive the anticipated (i.e., predicted) trajectories of other road users (e.g., external objects) of the vehicle transportation network from the world model module 5002. For at least some of the detected external objects (e.g., such as a vehicle, a pedestrian, a bicycle, and/or other external objects that are determined to be moving or likely to move), the world model module may maintain (e.g., predict and update) one or more hypotheses regarding the possible intentions of the real-world object. Examples of intentions (e.g., hypotheses) for a vehicle may include stop, turn right, turn left, go straight, pass, advance, yield, and park. Examples of intentions for a pedestrian may include stop (for example, at a stop sign), walk (for example, to cross an intersection), and run. A likelihood may be associated with each hypothesis. The likelihood is updated based on observations received from sensor data. The likelihood of a hypothesis is indicative of the immanency of the hypothesis.

The HMI module 5006 may cause a semiotic representation to be output (such as described with respect to the operation 4510 of FIG. 4). The HMI module 5006 may receive an acknowledgement in response to the semiotic representation. The HMI module 5006 may translate (e.g., interpret, convert, or otherwise translate) an external object's state information into an acknowledgement (e.g., a response) from the object. The state information may be translated into an explicit acknowledgement. The state information may be translated into an implicit acknowledgement. In some examples, a level of uncertainty may be associated with the response.

In an illustrative example, the HMI module 5006 may translate state information that is maintained by the world model module 5002, such as a sequence of a pedestrian's (e.g., an external object's) hand movements (e.g., arm raised and palm facing the vehicle) into a gesture commanding (e.g., an explicit acknowledgment) the vehicle to stop. For example, the HMI module 5006 may interpret a sequence of head and/or leg movements (e.g., pedestrian turning head towards the vehicle then looking down without moving the rest of the pedestrian's body) as an implicit acknowledgement to vehicle that the pedestrian is yielding the right of way to the vehicle.

The HMI module 5006 may use one or more methodologies, techniques, or technologies of motion detection and confirmation for translating an external object's state information into an acknowledgement. For example, with respect to a pedestrian, sensor (e.g., the sensor 1360 of FIG. 1) data (e.g., images, LiDAR data, etc.) may be compared to templates wherein a template correlates to an acknowledgement. For example, the vehicle may include one or more classifiers trained to recognize gestures, movements, and/or body positions and determine an acknowledgement based on state information associated with an external object. For example, a gesture recognition classifier, such as a Dynamic Time Warping (DTW) algorithm may be used to determine whether a received gesture signal matches a gesture template to identify the gesture.

Figure 6:
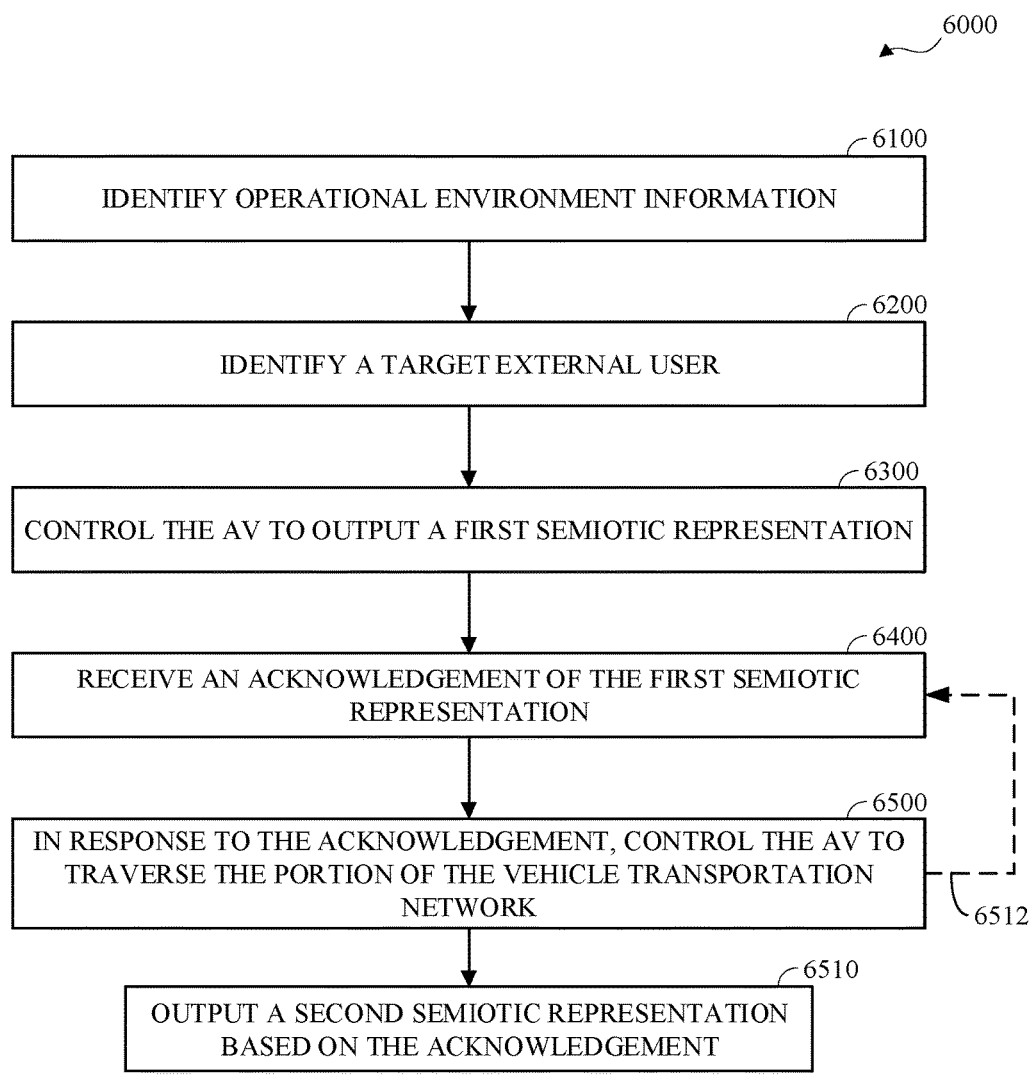
FIG. 6 is a diagram of a flowchart of a process for interactive external vehicle-user communication with integrated semiotic control in accordance with implementations of this disclosure.

FIG. 6 is a diagram of a flowchart of a process 6000 for interactive external vehicle-user communication in accordance with implementations of this disclosure. The process 6000 may be implemented in or by an autonomous vehicle (AV), such as the vehicle 1000 shown in FIG. 1 or one of the vehicles 2100/2110 shown in FIG. 2. The AV may be a semi-autonomous vehicle, or any other vehicle implementing autonomous driving. The AV is configured to traverse a portion of a vehicle transportation network.

The process 6000 may traverse the vehicle transportation network, or the portion thereof, such as described with respect to FIG. 4. The semiotic representation output at 4512 may be targeted to a target external user rather than being a broadcast-like message. The process 6000 may receive an acknowledgment from the target external user to the semiotic representation and, in response to the acknowledgement, control the AV to traverse the portion of the vehicle transportation network, which may include outputting a second a second semiotic representation based on the acknowledgement.

At 6100, the process 6000 identifies operational environment information representing a current operational environment for the AV, such that the operational environment information includes information representing an identified aspect of the current operational environment. The process 6000 may identify the operational environment information as described with respect to 4100 of FIG. 4.

At 6200, the process 6000 identifies the target external user. The target external user may be identified based on the current operational environment for the AV. The target external user may be a relevant external object, such as described with respect to FIG. 4. The target external user may be identified based on a hypothesis that may be tracked by a world model module, such as the world model module 5002 of FIG. 5. The target external user may be identified based on whether the target object is, or is likely to become, a blocking object, such as described with respect to FIG. 4. The target external user is identified as being, or likely to become, a blocking object based on a trajectory of the target external user. Identifying the target external user can include identifying multiple external users. For example, multiple external users that share one or more common properties can be identified at 6200. For example, the common property can be that the multiple external users are all crossing from one side to the other side of an intersection, are all within a speed range, and the like. As such, the target external user can be a group of external users.

The target external user may be identified based on proximity to the AV. For example, the target external user may be identified that is a user within a range distance of the AV. In an example, the range may be two to fifteen meters. Other ranges are possible.

At 6300, the process 6000 controls the AV to output a first semiotic representation of a control information of the AV related to the operational environment information. The first semiotic representation of the control information of the AV may be specific to (e.g., targeted at) the target external user. In an example, the process 6000 outputs the first semiotic representation as described with respect to 4510 of FIG. 4. For example, the first semiotic representation may include a vehicle intent and a vehicle intent basis, as described above. For example, the first semiotic representation can additionally, or instead, include at least one of the operational state of the AV or motion status of the AV.

At 6400, the process 6000 receives an acknowledgement of the first semiotic representation from the target external user. The acknowledgement is received from the target external user. The AV may map a response from the external user to the acknowledgement. The response from the external user may include zero or more gestures, actions, body (e.g., body parts) motions, other responses, or a combination thereof. As such, the response may be an explicit (e.g., active) response; the response may be an implicit (e.g., passive) response; the response may indicate user confusion or misunderstanding regarding the first semiotic representation; and the response can be an expected response, such as a response that non-responsive to the first semiotic representation.

In the case where the external target user is a group of external users, the acknowledgment can be received from any one of the group of external users. In the case that multiple conflicting acknowledgments are received, the least explicit response can be assumed to be (e.g., taken as) the response of the group of external users. For example, responses can be ranked accordingly to an explicitness degree where an explicit response can have a highest degree of explicitness and a response of confusion or misunderstanding can have a lowest degree of explicitness.

The AV may map the response of the target external user to an intention of the target external user. That is, the AV may interpret the response of the target external user as the intention of the target external user. The intention of the target external user may be based on a context of the response. The context of the response may be based on identified distinct vehicle operational scenarios of the AV. That is, for example, the process 6000 may map the response to an acknowledgment in the context of a road configuration, a location, other factors, or a combination thereof.

At 6500, in response to the acknowledgement, the process 6000 controls the AV to traverse the portion of the vehicle transportation network. Traversing the portion of the vehicle transportation network may include controlling the AV to output a second semiotic representation based on the acknowledgement from the target external user.

The operations of the process 6000 is now illustrated by use of examples. However, a person skilled in the art may appreciate that implementations according to this disclosure are not limited to or by the illustrative examples. In the following examples, it is assumed that the AV is stopped at a stop sign or otherwise yielding to a pedestrian (e.g., a target external user) and is displaying a semiotic representation (e.g., a first semiotic representation). The first semiotic representation may be displayed by the operation 6300 of the process 6000. The first semiotic representation may indicate to intention of the AV that the AV is stopping and yielding to the pedestrian so that the pedestrian may cross a road.

In a first scenario, the process 6000, such as by the HMI module 5006 of FIG. 5, may detect a response from the pedestrian. The response may be based on body language (e.g., a body part movement). For example, the process 6000 may detect a hand gesture, a head nod, or the like, that may be understood to mean thank you, OK, or the like. For example, social norms and rules of the road (e.g., a context) can be used to attach a meaning to the gestures. For example, at a stop sign, typically a driver/pedestrian who is yielded to acknowledges the person/driver who yields to him. As such, if the context includes a stop sign, an intersection, and vehicle state information indicating "yield," the AV can interpret acknowledgement within this context.

Any available technique for detecting the body language may be used. In an illustrative example, a hand gesture may be compared to (e.g., classified as, or otherwise compared to) template hand gestures that may indicate acknowledgement of the first semiotic representation. For example, the hand gesture may be recognized as an OK sign. In another example, the response may be detected based on eye tracking. For example, the process 6000 may detect that the pedestrian fixated on the first semiotic representation for a sufficiently long time to have understood (e.g., read) the first semiotic representation. As such, the acknowledgement is an explicit acknowledgement. Any number ways of receiving an explicit acknowledgement may be available.

In an example, the process 6000, at 6500, controls the AV to traverse the portion of the vehicle transportation network by, for example, waiting (e.g., by identifying vehicle control action(s) and control the AV accordingly) for the pedestrian to cross the road and proceeding once the pedestrian has crossed. In another example, controlling the AV at 6500 may include, at 6510, controlling the AV to output a second semiotic representation based on the acknowledgement from the target external user. In an example, the second semiotic representation may include an informational message. An example of an informational message may be "Please watch for other traffic." In an example, the second semiotic representation may include a confirmation of the explicit acknowledgement such as "You've indicated that you will be crossing," and a vehicle intent, such as "I will wait for you."

In a second scenario, the pedestrian proceeds to cross the road. Proceeding to cross the road by the pedestrian may be interpreted by the AV (such as at 6400 of the process 6000) to be an acknowledgement of the first semiotic representation. As such, the process 6000 receives an implicit acknowledgement from the target external user. Any number of ways of receiving an implicit acknowledgement may be available.

In an example, a hypothesis associated with an intention of the pedestrian to cross the road may be tracked, such as by the world model module 5002 of FIG. 5. The hypothesis may include predicted locations of the pedestrian based on the intention. In an example, the predicted locations may be compared to actual locations (based on received sensor data and associated with the pedestrian) of the pedestrian to determine that the pedestrian has acknowledged the first semiotic representation. As such, receiving the acknowledgement of the first semiotic representation, at 6400, may be based on determining that predicted locations of the pedestrian corresponding to the pedestrian crossing the road coincide with observed locations of the pedestrian.

In another example, receiving the acknowledgement of the first semiotic representation may be based on a body movement. For example, that the pedestrian has extended a leg in a direction consistent with crossing the road may be an acknowledgement received from the pedestrian. As such, an action of the pedestrian that is consistent with the intent of a hypothesis can be the acknowledgement of the first semiotic representation.

In an example, the process 6000, at 6500, controls the AV to traverse the portion of the vehicle transportation network by, for example, waiting (e.g., by identifying vehicle control action(s) and control the AV accordingly) for the pedestrian to cross the road and proceeding once the pedestrian has crossed. In another example, controlling the AV at 6500 may include, at 6510, controlling the AV to output a second semiotic representation based on the implicit acknowledgement from the target external user. The second semiotic representation may include an interpretation of the implicit acknowledgement and a vehicle intent. For example, the second semiotic representation may communicate a message that may understood by the pedestrian to mean "I am waiting for you to cross; but for your own safety, please pay attention next time."

In a third scenario, the pedestrian provides (i.e., the AV receives) an implicit acknowledgement that causes the AV to control the AV to traverse the portion of the vehicle transportation network according to a different intent than that included in the first semiotic representation. For example, the process 6000 may receive a response from the pedestrian which indicates that the pedestrian does not intend to cross the road.

For example, the process 6000 (such as via an HMI module, such as the HMI module 5006) may detect that the pedestrian is not moving and/or is moving in a direction that is inconsistent with crossing the road. For example, the pedestrian may be standing still. In another example, the pedestrian may look at, or toward, the AV and then look away, which the process 6000 may receive at 6400 as acknowledgements based on head orientation, gaze detection, or the like. As such, at 6500, the process 6000 controls the AV to traverse the portion of the vehicle transportation network according to a different intent than that output, at 6300, in the first semiotic representation. The process 6500 can, at 6510, output a second semiotic representation based on the acknowledgement. For example, the second semiotic representation may communicate a message that may understood by the pedestrian to mean "it seems that you are not crossing; so, I will go."

In another example, a delay may be associated with controlling the AV to traverse the portion of the vehicle transportation network, at 6500. For example, the delay may be used as a safeguard against a misinterpretation of the acknowledgement (whether implicit or explicit). The amount of the delay may be included in the second semiotic representation, at 6510. For example, the second semiotic representation may communicate a message that may be understood by the pedestrian to mean "it seems that you are not crossing; so, I will go in 3 seconds." In another example, a countdown may be associated with the delay and the process 6000 may update the second semiotic representation according to the countdown. For example, an initial second semiotic representation may be "it seems that you are not crossing; so, I will go in 3 seconds" and the second semiotic representation may be updated after the passage of one second to indicate "it seems that you are not crossing; so, I will go in 2 seconds," and so on.

In a fourth scenario, the AV receives an explicit acknowledgement that causes the AV to control the AV to traverse the portion of the vehicle transportation network according to a different intent than that included in the first semiotic representation. For example, the process 6000 may receive a response from the pedestrian which indicates that the pedestrian does not intend to cross the road and/or that the AV should proceed first. The response may be based on body language (e.g., a body part movement). For example, the process 6000 may detect a hand gesture, a head nod, or the like, that may be understood to mean that the pedestrian is yielding the right of way to the AV. Accordingly, the process 6500 can, at 6510, output a second semiotic representation based on the explicit acknowledgement. For example, the second semiotic representation may communicate a message that may understood by the pedestrian to mean "You are yielding to me and you are not crossing; so, I will go." In some examples, and as explained above a delay, a countdown, or both may be associated with, included in, or the like the second semiotic representation.

As mentioned above, an acknowledgement can indicate confusion or misunderstanding. For example, the AV can interpret the pedestrian's positioning of hands out to each side of the body with palms facing up and/or shoulders shrugging as a sign that the pedestrian is confused regarding the meaning of the first semiotic representation. As such, the second semiotic representation may communicate a message that clarifies the meaning of the first semiotic representation. As also mentioned above, an acknowledgement can be an expected (e.g., non-responsive) response. In an example, the second semiotic representation may communicate a message that may understood by the pedestrian to mean "I don't know what you mean; so, I will stop."

A person skilled in the art may appreciate that the second semiotic representation may be treated as the first semiotic representation. That is, the process 6000 can, at 6400, may receive an acknowledgement of the second semiotic representation, and, at 6500, in response to the acknowledgement, may control the AV to traverse the portion of the vehicle transportation network, which may include outputting, at 6510, a third semiotic representation. Such repetitive interaction is indicated with a dotted line 6512. As such, a visual interaction may be carried out between a human and an autonomous vehicle.

While the process 6000 and the accompanying scenarios are described with respect to a single external user, more than one external users are possible. In a simple example, a semiotic representation that is intended for a specific target external user may include an image (such as an image captured by a camera of the AV). As such, whereas multiple semiotic representations are output, a target external user may identify that a semiotic representation is intended for target external user based on the image of the target external user.

In an example, a semiotic representation intended for a first target external user, such as the semiotic representation output at 4510 of FIG. 4, the first semiotic representation output at 6300 of FIG. 6, the second semiotic representation output at 6510 of FIG. 6, any semiotic representation according to implementations of this disclosure, or a combination thereof, may be based on information related to a second external user. The information related to the second external user may be a hypothesis associated with the second external user. The hypothesis may be as described with respect to the world model module 5002 of FIG. 5. As such, a trajectory and/or state information associated with the hypothesis may be tracked with respect to the second external user. The trajectory may include predicted locations of the second external user based on the trajectory. The trajectory may be a path of the second external user.

As such, a process according to implementations of this disclosure may identify a first trajectory of an external user (e.g., the second external user) and, in response to determining that the first trajectory of the external user converging with a second trajectory of the target external user, control the AV to output, for the external user, a third semiotic representation based on the determining that the first trajectory converging with the second trajectory.

For example, assume that the AV is at a crosswalk and is controlled to yield to a pedestrian (i.e., the target external user). A hypothesis may be tracked by a world module model of a human-driven vehicle (i.e., the external user). Based on first predicted locations of the external user and second predicted locations of the target external user, it may be determined that the path of the pedestrian and the trajectory of the external user converge (for example, based on determining that the pedestrian and the human-driven vehicle are predicted to be at the approximate location at a same time t=T0+dt, where T0 is a current time and dt is a discrete time increment in the near future).

As such, a semiotic representation may be output for the external user essentially indicating to the human-driven vehicle the presence of the pedestrian. For example, the semiotic representation may essentially communicate to the human-driven vehicle "slow down, there's a pedestrian." Alternatively, or in addition, a semiotic representation may be output for the pedestrian indicating "STOP! a car is coming." As such, the AV may be controlled to output, for the target external user, a fourth semiotic representation based on the determining that the first trajectory converging with the second trajectory.

Figure 7:
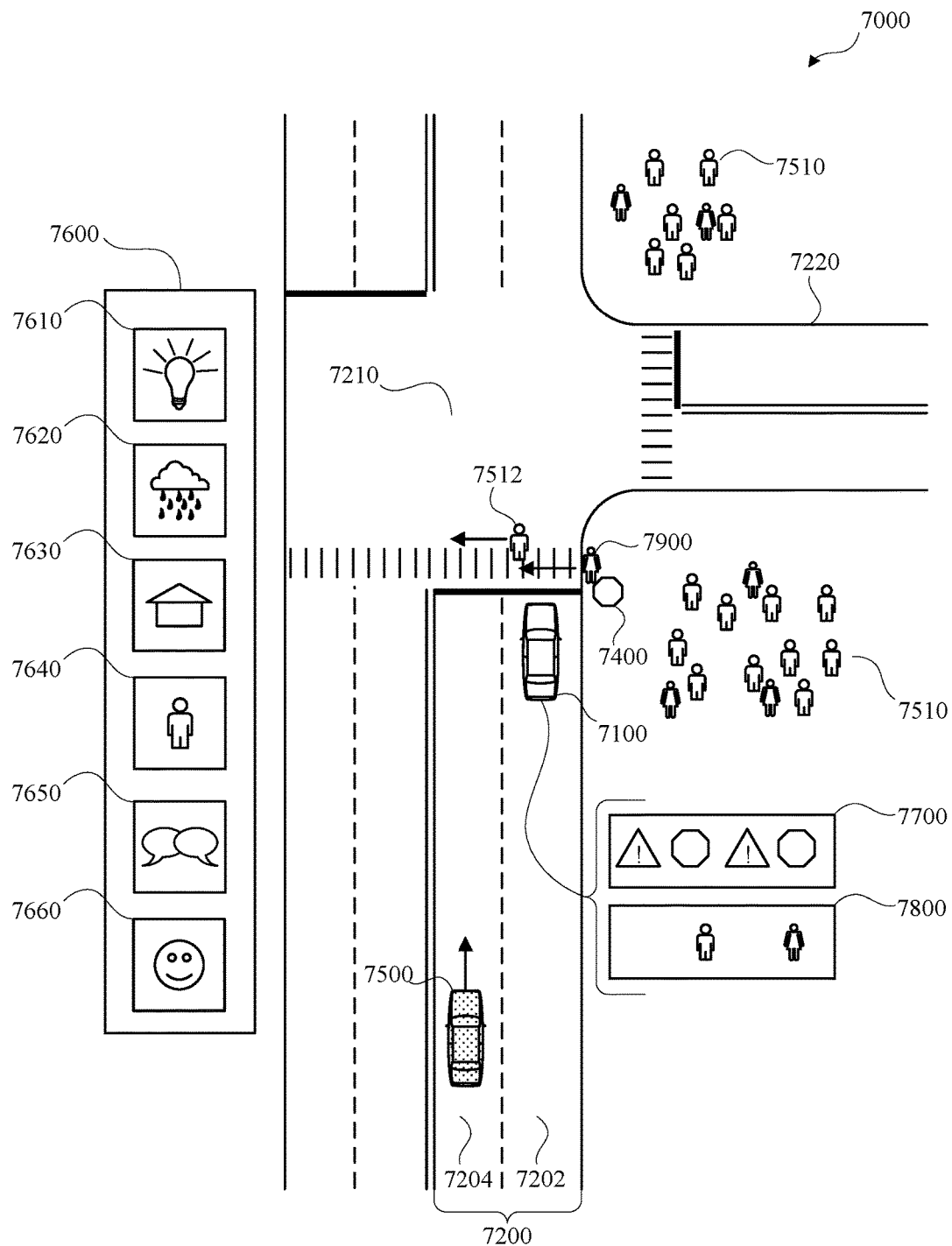
FIG. 7 is a diagram of an example of interactive external vehicle-user communication with integrated semiotic control for traversing a yield-stop scenario in accordance with implementations of this disclosure.

FIG. 7 is a diagram of an example of interactive external vehicle-user communication with integrated semiotic control for traversing a yield-stop scenario in accordance with implementations of this disclosure.

In FIG. 7, the yield-stop scenario 7000 includes a vehicle 7100, such as the vehicle 1000 shown in FIG. 1, one of the vehicles 2100/2110 shown in FIG. 2, or any other vehicle implementing interactive external vehicle-user communication with integrated semiotic control, such as an autonomous vehicle, a semi-autonomous vehicle, or any other vehicle implementing autonomous driving, traversing a portion of a current road (e.g., the road 7200) in a first lane 7202, adjacent to a second lane 7204. The vehicle 7100 is at an intersection 7210 with an intersecting road 7220. The yield-stop scenario 7000 includes a traffic control device 7400 for the intersection 7210, a remote vehicle 7500 external object traveling along the road 7200 toward the intersection 7210 in the second lane 7204, and pedestrian 7510 external objects.

Traversing the current portion of the vehicle transportation network shown in FIG. 7 may include identifying operational environment information indicating that the current operational environment has a bright or daytime illumination state, has a wet or rainy weather or precipitation state, includes a residential neighborhood, includes external objects, includes external activities, and includes user configuration information indicating low vehicle control optimization priority.

Identifying the operational environment information may include identifying external activity information, such as social media information, indicating a concert in a residential neighborhood park proximate to, such as adjacent to, the road 7200, and temporally concurrent with, or proximate to, a current temporal location.

Aspects of the current operational environment are indicated at 7600. For example, the bright or daytime illumination state is indicated at 7610, the wet or rainy weather or precipitation state is indicated at 7620, the residential neighborhood is indicated at 7630, the presence of external objects is indicated at 7640, the occurrence of external activities is indicated at 7650, and user configuration information indicating low vehicle control optimization priority is indicated at 7660. The indications 7610, 7620, 7630, 7640, 7650, 7660 are shown for simplicity and clarity of explanation.

For example, for traversing the current portion of the vehicle transportation network shown in FIG. 7 at a temporal location, identifying the operational environment information may include identifying that the first pedestrian 7512 is blocking the vehicle 7100, which may indicate that the first pedestrian 7512 is in the intersection 7210 and has an expected path 9512 indicating that the first pedestrian 7512 is crossing the intersection 7210, or otherwise determining that a probability that a current or expected spatiotemporal location of the first pedestrian 7512 is convergent with an expected spatiotemporal location of the vehicle 7100 corresponding to concurrently proceeding through the intersection exceeds a defined threshold.

Identifying the operational environment information may include determining that a probability that a current or expected spatiotemporal location of the second pedestrian 7900 is convergent with an expected spatiotemporal location of the vehicle 7100 corresponding to concurrently proceeding through the intersection exceeds the defined threshold. For example, a world model module, such as the world model module 5002 of FIG. 5, may maintain a hypothesis for the second pedestrian 7900 that the second pedestrian 7900 intends to cross the intersection. The expected spatiotemporal location of the second pedestrian 7900 may be calculated by a trajectory planner, such as the trajectory planner 5004 of FIG. 5.

Interactive external vehicle-user communication with integrated semiotic control for traversing the yield-stop scenario 7000 at the temporal location may include identifying a vehicle control action, which may be similar to the vehicle control action identification shown at 4200 in FIG. 4, except as described herein.

For example, for traversing the current portion of the vehicle transportation network shown in FIG. 7 at the temporal location, a 'Yield-Wait' vehicle control action may be identified, corresponding to controlling the vehicle 7100 to remain stationary in accordance with the traffic control device 7400 at the intersection 7210 and in accordance with the determination that the probability that the current or expected respective spatiotemporal location of the first pedestrian 7512, the second pedestrian 7900, or both, is convergent with an expected spatiotemporal location of the vehicle 7100 corresponding to concurrently proceeding through the intersection exceeds the defined threshold.

Identifying the 'Yield-Wait' vehicle control action may include identifying a primary vehicle control basis in accordance with the determination that the first pedestrian 7512 is crossing the intersection 7210, the determination that the second pedestrian 7900 is crossing the intersection 7210, or both, or that the probability that the current or expected respective spatiotemporal location of the first pedestrian 7512, the second pedestrian 7900, or both, is convergent with an expected spatiotemporal location of the vehicle 7100 corresponding to concurrently proceeding through the intersection exceeds the defined threshold.

Interactive external vehicle-user communication with integrated semiotic control for traversing the yield-stop scenario 7000 at the temporal location may include identifying vehicle control modification information, which may be similar to the vehicle control modification information identification shown at 4300 in FIG. 4, except as described herein.

For example, traversing the current portion of the vehicle transportation network shown in FIG. 7 at the temporal location may include identifying vehicle control modification information for a 'Yield-Wait Show Rational' vehicle control parameter corresponding to the identified 'Yield-Wait' vehicle control action, the primary vehicle control basis, or both, which may indicate one or more parameters for outputting a semiotic representation of the primary vehicle control basis.

Interactive external vehicle-user communication with integrated semiotic control for traversing the yield-stop scenario 7000 at the temporal location may include identifying vehicle control information, which may be similar to the vehicle control information identification shown at 4400 in FIG. 4, except as described herein.

For example, for traversing the current portion of the vehicle transportation network shown in FIG. 7 at the temporal location, identifying the vehicle control information may include identifying a value of the 'Yield-Wait Show Rational' vehicle control parameter corresponding to the identified 'Yield-Wait' vehicle control action, the primary vehicle control basis, or both, which may include identifying one or more parameters for outputting the semiotic representation of the primary vehicle control basis.

For example, identifying vehicle control information for traversing the yield-stop scenario 7000 at the temporal location may include identifying values for the 'Yield-Wait Show Rational' vehicle control parameters corresponding to the identified 'Yield-Wait' vehicle control action, such as based on a combination of defined 'Yield-Wait Show Rational' vehicle control parameter values corresponding to the identified 'Yield-Wait' vehicle control action, bright or daytime illumination state 'Yield-Wait Show Rational' vehicle control modifiers corresponding to the identified 'Yield-Wait' vehicle control action, wet or rainy weather or precipitation state 'Yield-Wait Show Rational' vehicle control modifiers corresponding to the identified 'Yield-Wait' vehicle control action, residential neighborhood 'Yield-Wait Show Rational' vehicle control modifiers corresponding to the identified 'Yield-Wait' vehicle control action, inclusion of external objects 'Yield-Wait Show Rational' vehicle control modifiers corresponding to the identified 'Yield-Wait' vehicle control action, inclusion of external activities 'Yield-Wait Show Rational' vehicle control modifiers corresponding to the identified 'Yield-Wait' vehicle control action, and low vehicle control optimization priority vehicle control modifiers corresponding to the identified 'Yield-Wait' vehicle control action.

Interactive external vehicle-user communication with integrated semiotic control for traversing the yield-stop scenario 7000 at the temporal location may include controlling the vehicle 7100 to traverse the vehicle transportation network, or a portion thereof, which may be similar to the traversing shown at 4500 in FIG. 4, except as described herein, and which may include controlling the vehicle 7100 to remain stationary at the intersection 7210 in accordance with the vehicle control information, which may include outputting a semiotic representation of the vehicle control information, which may include outputting a semiotic representation of an operational state of the vehicle concurrent with controlling the vehicle to traverse the portion of the vehicle transportation network in accordance with the vehicle control information, outputting a semiotic representation of the current primary vehicle control basis, or both.

For example, the vehicle control information may include information for controlling the velocity of the vehicle 7100 to output the semiotic representation of the vehicle control information, or a portion thereof, such as a portion including the semiotic representation of the operational state of the vehicle concurrent with controlling the vehicle to traverse the portion of the vehicle transportation network in accordance with the vehicle control information, by controlling the vehicle 7100 to remain stationary at the intersection 7210 in accordance with the vehicle control information, which may include using a velocity control unit of the vehicle 7100 as an output device, or a portion thereof, for outputting the semiotic representation, or a portion thereof, by controlling the velocity control unit of the vehicle 7100 to output the semiotic representation of the vehicle control information, or a portion thereof, in accordance with the vehicle control information, such as by outputting the semiotic representation of the operational state of the vehicle concurrent with controlling the vehicle to traverse the portion of the vehicle transportation network in accordance with the vehicle control information, or a portion thereof, by controlling an acceleration rate, a velocity, the timing of performing a velocity vehicle control action, or a combination thereof.

Controlling the velocity control unit of the vehicle 7100 to output the semiotic representation of the vehicle control information, or a portion thereof, in accordance with the vehicle control information may include controlling velocity of the vehicle 7100, such as by maintaining a stationary state at the intersection 7210 in accordance with the 'Yield-Wait' vehicle control action as modified by related vehicle control modification information, which may output at least a portion of the semiotic representation of at least a portion of the vehicle control information indicating that the vehicle is yielding to the first pedestrian 7512 and the second pedestrian 7900.

In FIG. 7, a current intention indicator 7700 is shown as including the sequence of stop indicators and yield indicators to indicate that traversing the portion of the vehicle transportation network shown in FIG. 7 may include outputting a portion of the semiotic representation of controlling the vehicle 7100 to perform the 'Yield-Wait' vehicle control action using the external luminous presentation unit of the vehicle 7100 to indicate the imminent or expected operational state of the vehicle 7100 corresponding to controlling the vehicle 7100 in accordance with the 'Yield-Wait' vehicle control action.

Although the portion of the semiotic representation of controlling the vehicle 7100 to perform the 'Yield-Wait' vehicle control action output using the external luminous presentation unit shown at 7700 in FIG. 7 is similar to the portion of the semiotic representation of controlling the vehicle 7100 to perform the 'Yield-Stop' vehicle control action output using the external luminous presentation unit for a temporal period, which may be concurrent with a temporal period for outputting the portion of the semiotic representation of controlling the vehicle 7100 to perform the 'Yield-Stop' vehicle control action output by controlling the velocity of the vehicle 7100 by decelerating. 7700.

The portion of the semiotic representation of controlling the vehicle 7100 to perform the 'Yield-Wait' vehicle control action output using the external luminous presentation unit may be output using the external luminous presentation unit for a temporal period, which may be concurrent with a temporal period for outputting the portion of the semiotic representation of controlling the vehicle 7100 to perform the 'Yield-Wait' vehicle control action output by controlling the velocity of the vehicle 7100 by maintaining a stationary state.

Controlling the vehicle 7100 to remain stationary at the intersection 7210 in accordance with the vehicle control information may include controlling the vehicle 7100 to output a semiotic representation of the primary vehicle control basis. For example, the current rationale indicator 7800 is shown as including a first representation of a pedestrian corresponding to the first pedestrian 7512 indicated by the current primary vehicle control basis and a second representation of a pedestrian corresponding to the second pedestrian 7900 indicated by the current primary vehicle control basis. The relative position of the pedestrian indicators in the current rationale indicator 7800 may correspond to the location of the first pedestrian 7512 and the second pedestrian 7900 in the vehicle transportation network relative to the vehicle 7100.

In an example of the yield-stop scenario 7000, the second pedestrian 7900 may be identified as a target external user, as described with respect to 6200 of FIG. 6. A semiotic representation may be output for the second pedestrian 7900, as described with respect to 6300 of FIG. 6. An acknowledgement may be received from the second pedestrian 7900, as described with respect to 6400 of FIG. 6. As mentioned above, the acknowledgement may be implicit or explicit. In response to the acknowledgement, the vehicle 7100 may be controlled to traverse the intersection 7210, which may include outputting a second semiotic representation based on the acknowledgement.

In an example of the yield-stop scenario 7000, the vehicle 7100 (more specifically, a world model module and/or a trajectory planner of the vehicle 7100) may determine that the respective trajectories, based on respective hypotheses, of the remote vehicle 7500 and the second pedestrian 7900 may converge. As such, the vehicle 7100 may be controlled to output a third semiotic representation indicating the converging trajectories. As indicated above, the third semiotic representation can be output to one, or both, of the remote vehicle 7500 and the second pedestrian 7900. For example, the third semiotic representation may be targeted to the second pedestrian 7900 indicating the remote vehicle 7500 is incoming. For example, the third semiotic representation may be targeted to remote vehicle 7500 indicating that the second pedestrian 7900 may be in the path of the remote vehicle 7500.

The interactive external vehicle-user communication described herein may be used to enable interactions between a human and an AV, where the interactions are not specifically related to traversing a portion of a vehicle transportation network. In an example, the interactions may be extensions of (e.g., subsequent to) the AV traversing a portion of a vehicle transportation network. The AV may be operating under or in an operational context that is a service operational context. Examples of service operational contexts include, as mentioned above, a robo taxi, a robo delivery, or the like, operational context.

Figure 8:
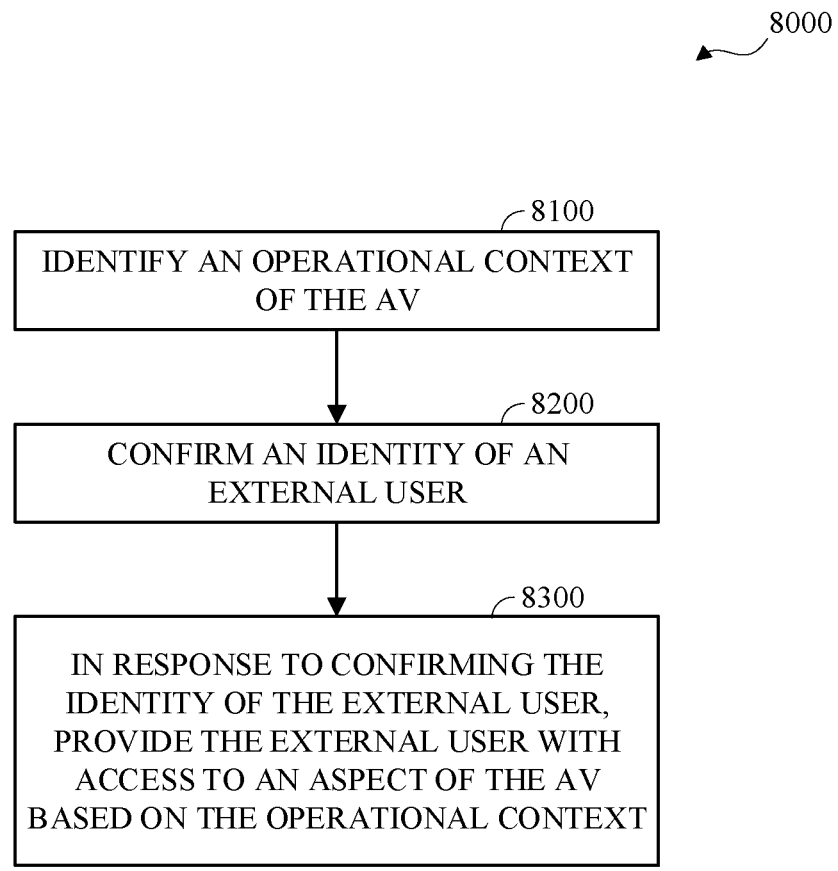
FIG. 8 is a diagram of a flowchart of a process for interactive external vehicle-user communication with integrated semiotic control in accordance with implementations of this disclosure.

FIG. 8 is a diagram of a flowchart of a process 8000 for interactive external vehicle-user communication with integrated semiotic control in accordance with implementations of this disclosure. The process 8000 may be implemented in or by an autonomous vehicle (AV), such as the vehicle 1000 shown in FIG. 1 or one of the vehicles 2100/2110 shown in FIG. 2. The AV may be a semi-autonomous vehicle, or any other vehicle implementing autonomous driving. The process 8000 may be executed by a process (such as the processor 1330 of FIG. 1) that is configured to execute instructions stored on a non-transitory computer readable medium (such as the memory 1340 of FIG. 1) to perform the below-described operations.

At operation 8100, the process 8000 identifies an operational context of the AV. Identifying the operational context may include identifying parameters of the operational context.

In an example, the operational context may be a service operational context. A service operational context is such that the AV is configured to provide a service to a customer. Non-limiting examples of a service operational contexts include a taxi service and a food delivery service. The parameters of the service operational context may include a destination location (e.g., an address, such as a geolocation, of a delivery location; an address, such as a geolocation, of a pickup location). The parameters may include other information that may be used to identify a recipient (i.e., a first external user) of the service. For example, the parameters may include a name of the person (i.e., a second external user) that is to receive the service, a phone number (e.g., a full phone number, or partial phone number, such as the last four digits) of the person that is to receive the service, a phone number (or a partial phone number) of a person requesting the service, more, fewer, other parameters, or a combination thereof. In some situations, the first external user and the second external user may be the same external user.

The operational context may be an emergency operational context. For example, the AV may include self-diagnostic controllers and/or sensors. Based on a self-diagnosis, the AV may enter (e.g., set the operational context of the AV to be) an emergency operational context. That is, the AV identifies the operational context as an emergency operational context.

For example, a self-diagnostic controller may determine that the AV experienced a tire blowout and, accordingly, enters the emergency operational context. The emergency operational context may include traversing a vehicle transportation network, or a portion thereof, such as described with respect to FIG. 4. For example, in the case of a tire blowout, the AV may be operated to turn on the right signal (e.g., a semiotic representation) and output a message "I am pulling over" (e.g., a semiotic representation) and traverse the portion of the vehicle transportation system to safely pull over. Identifying the emergency operational context may include sending the diagnostic information to an emergency roadside service and/or a teleoperator (who may contact the emergency roadside service). Identifying the emergency operational context may include receiving an identity of a roadside assistance service that is to perform the service on the AV. The parameters of the emergency operational context may include a name of a roadside assistance service, diagnostic information describing the emergency, more, fewer, other parameters, or a combination thereof.

In another example, a self-diagnostic controller may determine that the AV was involved in an accident and, accordingly, the police may be informed of the accident. In an example, a teleoperator may receive the diagnostic information and may inform the police; and/or the AV, via an electronic communication interface, such as the electronic communication interface 1370 of FIG. 1, may notify the police. The police may be notified via other means.

In response to identifying the operational context, an external user may need to interact with the AV. For example, the external user may be the passenger of the robo taxi service; the external user may be the recipient of the delivered food of the robo delivery service; the external user may be a serviceman who is to repair and/or replace the tire; or the external user may the policeman responding to the accident.

At operation 8200, the process 8000 confirms an identity of the external user. In an example, input may be solicited from the external user to confirm the identity of the external user. Several ways may be available for soliciting input from the external user. For example, the external user may provide the input via a keypad, a keyboard, a microphone, a camera, and/or some other device or peripheral that may be used as an input device. The AV may also include devices or peripherals for providing information and prompts to the external user. Such devices or peripherals may include a monitor, a display, a speaker, more, fewer, other output devices, or a combination thereof.

The input received from the external user may be compared to parameters of the operational context. For example, facial recognition may be used. In an example, a camera of the AV may be used to acquire an image of the user, which may be compared to a social media image of the external user, to a profile image (e.g., a profile that is associated with the operational context) of the external user, to an image that the external user provided at the time that the external user requested the service of the operational context), or some other image of the external user.

For example, voice recognition may be used. In an example, a microphone of the AV may be used to acquire a voice sample of the external user, which may be compared to another voice sample that is provided by the user upon ordering the service, a profile voice sample, or some other voice sample.

For example, two-factor authentication may be used. In an illustrative example, the external user may be prompted to provide the last four digits of the external user's phone number. The provided four digits may be compared to the last four digits of phone number that is a parameter of the operational context and, if the comparison results in a match, a verification code may be sent to the external user's phone. The external user may enter the provided verification code via an input device (e.g., a keypad).

Other examples of confirming the identity of the external user may be available other than or in addition to those described above. In yet another example, a code (e.g., a bar code, a QR code, etc.) may be sent to the external user (e.g., to a device of the external user). Upon presenting the code to an input device of the AV, the identity of the user may be confirmed.

At operation 8300, in response to confirming the identity of the external user, the process 8000 may provide the external user with access to an aspect of the AV based on the operational context. In an example, providing the external user with access to an aspect of the AV based on the operational context may include unlocking a door (so that, for example, the external user may enter). In an example, providing the external user with access to an aspect of the AV may include opening, such as a window, so that the external user may receive (e.g., retrieve, take possession) of items delivered to the external user. In an example, providing the external user with access to an aspect of the AV may include providing access to another physical aspect of the AV, such as, for example, unlocking a trunk so that a service person may retrieve a spare tire.

In another example, providing the external user with access to an aspect of the AV may include and/or may additionally include initiating a communication session between the external user and a remote operator. For example, upon taking delivery of a delivered item, the external user may be prompted whether the user is satisfied with the service. The external user may indicate that the service was deficient. Several ways are possible for the user to indicate that the service was deficient. In an illustrative example, an input form may be displayed to the user prompting the user to answer questions relating to the service. For example, in the case of food delivery, the external user may be prompted as to whether the delivered food matches the ordered food, is of good quality, is complete, and so on. The external user may also be given the option to be connected to a remote operator (e.g., a customer service representative) who may address the external user's complaints with respect to the service. Accordingly, the process 8000 may initiate a communication session between the external user and the remote operator.

Similarly, in the case of an emergency operational context, the external user (e.g., a policeman) may initiate a communication session with a remote operator who may provide additional assistance to the external user.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that may tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored on memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An autonomous vehicle (AV) configured to traverse a portion of a vehicle transportation network, the AV comprising:
   a processor configured to execute instructions stored on a non-transitory computer readable medium to:
      identify operational environment information representing a current operational environment for the AV, such that the operational environment information includes information representing an identified aspect of the current operational environment;
      identify a target external user based on the current operational environment for the AV, the target external user is identified based on sensor information from a sensor of the AV;
      control the AV to output, for the target external user, a first semiotic representation of a control information of the AV related to the operational environment information;
      receive an acknowledgement of the first semiotic representation from the target external user; and
      in response to the acknowledgement, control the AV to traverse the portion of the vehicle transportation network, such that controlling the AV to traverse the portion of the vehicle transportation network includes controlling the AV to output a second semiotic representation based on the acknowledgement from the target external user.

2. The AV of claim 1, wherein the processor is configured to execute the instructions to control the AV to output the second semiotic representation by controlling an output device of the AV to output at least a portion of the second semiotic representation, wherein the output device includes at least one of an external luminous presentation unit of the autonomous vehicle, an external aural presentation unit of the AV, a directional state control unit of the AV, or a kinetic state control unit of the AV.

3. The AV of claim 1,
   wherein the instructions to receive the acknowledgement from the target external user comprise to:
      receive an implicit acknowledgement from the target external user; and
   wherein the second semiotic representation comprises an interpretation of the implicit acknowledgement and a vehicle intent.

4. The AV of claim 3, the processor is further configured to execute the instructions to:
   control the AV to traverse a portion of the vehicle transportation network in accordance with the vehicle intent.

5. The AV of claim 1, wherein the first semiotic representation comprises a vehicle intent and a vehicle intent basis.

6. The AV of claim 1,
   wherein the instructions to receive the acknowledgement from the target external user comprise to:
      receive an explicit acknowledgement from the target external user; and
   wherein the second semiotic representation comprises a confirmation of the explicit acknowledgement and a vehicle intent.

7. The AV of claim 1, wherein the second semiotic representation comprises an informational message.

8. The AV of claim 1, wherein the processor is further configured to execute the instructions to:
  identify a first trajectory of an external user; and
  in response to determining that the first trajectory of the external user converging with a second trajectory of the target external user, control the AV to output, for the external user, a third semiotic representation based on the determining that the first trajectory converging with the second trajectory.

9. The AV of claim 8, wherein the processor is further configured to execute the instructions to:
  control the AV to output, for the target external user, a fourth semiotic representation based on the determining that the first trajectory converging with the second trajectory of the target external user.

10. A method of traversing a portion of a vehicle transportation network by an autonomous vehicle (AV), comprising:
  identifying operational environment information representing a current operational environment for the AV, such that the operational environment information includes information representing an identified aspect of the current operational environment;
  identifying a target external user based on the current operational environment for the AV, the target external user is identified based on sensor information from a sensor of the AV;
  controlling the AV to output, for the target external user, a first semiotic representation of a control information of the AV related to the operational environment information;
  receiving an acknowledgement of the first semiotic representation from the target external user; and
  in response to the acknowledgement, controlling the AV to traverse the portion of the vehicle transportation network, such that controlling the AV to traverse the portion of the vehicle transportation network includes controlling the AV to output a second semiotic representation based on the acknowledgement from the target external user.

11. The method of claim 10, wherein controlling the AV to output the second semiotic representation comprises:
  controlling an output device of the AV to output at least a portion of the second semiotic representation, wherein the output device includes at least one of an external luminous presentation unit of the autonomous vehicle, an external aural presentation unit of the AV, a directional state control unit of the AV, or a kinetic state control unit of the AV.

12. The method of claim 10,
  wherein receiving the acknowledgement from the target external user comprises:
    receiving an implicit acknowledgement from the target external user; and
  wherein the second semiotic representation comprises an interpretation of the implicit acknowledgement and a vehicle intent.

13. The method of claim 12, further comprising:
  controlling the AV to traverse the portion of the vehicle transportation network in accordance with the vehicle intent.

14. The method of claim 10, wherein the first semiotic representation comprises a vehicle intent and a vehicle intent basis.

15. The method of claim 10,
  wherein receiving the acknowledgement from the target external user comprises:
    receiving an explicit acknowledgement from the target external user; and
  wherein the second semiotic representation comprises a confirmation of the explicit acknowledgement and a vehicle intent.

16. The method of claim 10, wherein the second semiotic representation comprises an informational message.

\* \* \* \* \*